United States Patent
Hildebrandt et al.

(10) Patent No.: US 9,810,269 B2
(45) Date of Patent: Nov. 7, 2017

(54) CONSTANT VELOCITY JOINT IN THE FORM OF A COUNTER TRACK JOINT

(71) Applicant: GKN Driveline International GmbH, Lohmar (DE)

(72) Inventors: Wolfgang Hildebrandt, Siegburg (DE); Thomas Weckerling, Sankt Augustin (DE); Stephan Maucher, Siegburg (DE); Rolf Cremerius, St. Augustin (DE); Ida Benner, Troisdorf (DE); Hans-Jurgen Post, Bonn (DE); Anna Gremmelmaier, Sankt Augustin (DE)

(73) Assignee: GKN Driveline International GmbH, Lohmar (DE)

( * ) Notice: Subject to any disclaimer, the term of this patent is extended or adjusted under 35 U.S.C. 154(b) by 55 days.

(21) Appl. No.: 14/779,612

(22) PCT Filed: Mar. 27, 2014

(86) PCT No.: PCT/EP2014/056224
§ 371 (c)(1),
(2) Date: Sep. 24, 2015

(87) PCT Pub. No.: WO2014/154838
PCT Pub. Date: Oct. 2, 2014

(65) Prior Publication Data
US 2016/0053817 A1    Feb. 25, 2016

(30) Foreign Application Priority Data

Mar. 27, 2013 (DE) .......................... 10 2013 103 155

(51) Int. Cl.
*F16D 3/224* (2011.01)
*F16D 3/223* (2011.01)

(52) U.S. Cl.
CPC .... *F16D 3/223* (2013.01); *F16D 2003/22303* (2013.01); *F16D 2003/22309* (2013.01); *Y10S 464/906* (2013.01)

(58) Field of Classification Search
CPC ..................... F16D 3/223; F16D 3/224; F16D 2003/22309; F16D 2003/22303; Y10S 464/906

(Continued)

(56) References Cited

U.S. PATENT DOCUMENTS

| 2,046,584 A | 7/1936 | Rzeppa |
| 2,875,600 A * | 3/1959 | Miller, Jr. ............. F16D 3/2245 464/145 |

(Continued)

FOREIGN PATENT DOCUMENTS

| DE | 3939531 C1 | 6/1991 |
| DE | 19706864 C1 | 6/1998 |

(Continued)

OTHER PUBLICATIONS

International Search Report and Written Opinion for PCT/EP2014/056224 dated Jun. 16, 2014 (10 pages).

(Continued)

*Primary Examiner* — Gregory J Binda
(74) *Attorney, Agent, or Firm* — Bejin Bieneman PLC

(57) ABSTRACT

A constant velocity joint comprises an outer joint part with a longitudinal axis and first and second outer ball tracks. The outer joint part comprises an attachment side and an aperture side. An inner joint part has a longitudinal axis and first and second inner ball tracks. with a torque transmitting ball 14 in each pair of tracks, and a ball cage 15 with cage windows 18 in which the balls 14 are held. In each angular position of the constant velocity joint 11 an opening angle is enclosed between an outer tangent and an inner tangent at the ball. At (Continued)

least one of the first and second pairs of tracks is designed such that, within a small articulation angle range comprising at least the joint central plane, at at least an articulation angle, an opening angle amounts to zero, and within a greater articulation angle range, an aperture-side opening angle of a first pair of tracks widens in the opposite axial direction relative to the aperture-side opening angle of a second pair of tracks.

17 Claims, 13 Drawing Sheets

(58) Field of Classification Search
USPC .......................................................... 464/145
See application file for complete search history.

(56) References Cited

U.S. PATENT DOCUMENTS

| | | | |
|---|---|---|---|
| 3,633,382 A | 1/1972 | Westercamp | |
| 6,709,338 B2* | 3/2004 | Weckerling | F16D 3/2233 464/145 |
| 8,096,887 B2 | 1/2012 | Oh et al. | |
| 9,133,888 B2* | 9/2015 | Gremmelmaier | F16D 3/223 |
| 2004/0033837 A1 | 2/2004 | Weckerling et al. | |
| 2009/0149263 A1* | 6/2009 | Kozlowski | F16D 3/223 464/145 |
| 2010/0190558 A1 | 7/2010 | Oh et al. | |

FOREIGN PATENT DOCUMENTS

| | | |
|---|---|---|
| DE | 10337612 A1 | 6/2004 |
| DE | 102012102678 A1 | 10/2013 |
| JP | 2003021158 A | 1/2003 |
| JP | 2007255463 A | 10/2007 |
| JP | 200819961 A | 1/2008 |
| WO | 2006048031 A1 | 5/2006 |
| WO | 2013029655 A1 | 3/2013 |

OTHER PUBLICATIONS

International Preliminary Report on Patentability for PCT/EP2014/056224 dated Mar. 17, 2015 (7 pages).

* cited by examiner

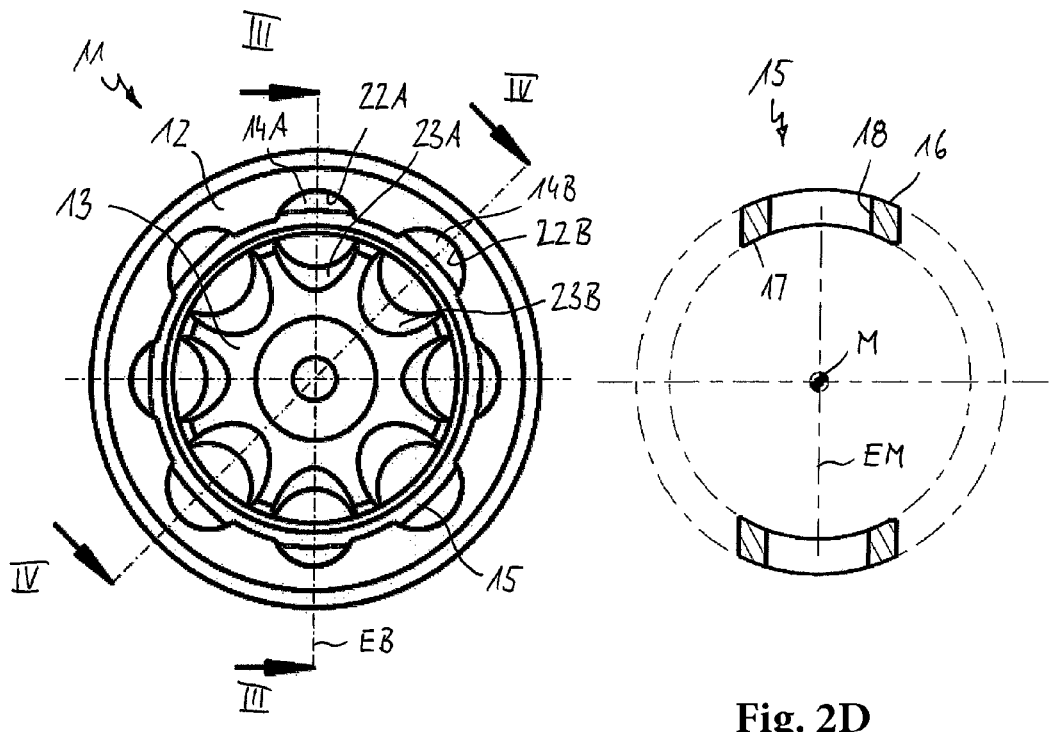
Fig. 2A
Fig. 2D
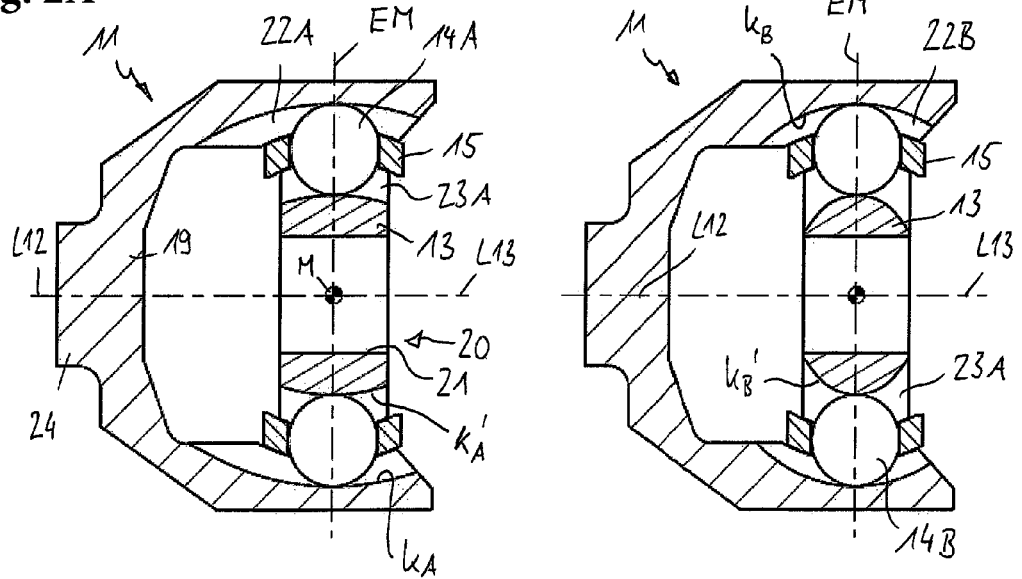
Fig. 2B
Fig. 2C

| Outer joint part (12) | | | |
|---|---|---|---|
| | 1st ball track (center line A) | | |
| | 8.1 | 8.2 | 8.3 |
| 8.4 | A1 / B1 | A2 / B1 | A3 / B1 |
| 8.5 | A1 / B2 | A2 / B2 | A3 / B2 |
| 8.6 | A1 / B3 | A2 / B3 | A3 / B3 |

2nd ball track (center line B)

Fig. 8

CONSTANT VELOCITY JOINT IN THE FORM OF A COUNTER TRACK JOINT

CROSS-REFERENCE TO RELATED APPLICATIONS

This application is a national stage of, and claims priority to, Patent Cooperation Treaty Patent Application No. PCT/EP2014/056224, filed on Mar. 27, 2014, which claims priority to German Application No. DE 10 2013 103 155.2, filed on Mar. 27, 2013, each of which applications are hereby incorporated herein by reference in their entireties.

BACKGROUND

From DE 103 37 612 A1 a counter track joint is known with reversed control angles. First outer ball tracks of the outer joint part and first inner ball tracks of the inner joint part form first pairs of tracks. Second outer ball tracks of the outer joint part and second inner ball tracks of the inner joint part form second pairs of ball tracks. When the joint is in an aligned condition, the opening angle of the first pairs of tracks opens towards the attachment end. The opening angle of the second pairs of tracks opens towards the aperture end when the joint is in the aligned condition.

From document U.S. Pat. No. 8,096,887 B2 a constant velocity universal joint is known in the form of a fixed joint wherein all the outer and inner ball track are identical relative to one another. In one embodiment, the outer ball tracks comprise two circular arch portions with different centers and an intermediate straight portion. The circular arch portions are designed such that, when the joint is articulated, a respective opening angle at a ball moving towards the aperture end and a respective opening angle at a ball moving towards the joint base open in opposed axial directions.

From DE 197 06 864 C1 a constant velocity universal joint is known wherein the center lines of the outer and inner ball tracks are each composed of two adjoining, differently curved portions. Between the two curved portions a turning point is provided with a tangent in the turning point extending in an axis-parallel way. The inner curved portions of the ball tracks extend beyond the joint central plane by 10° towards the aperture end of the outer joint part.

Document U.S. Pat. No. 2,046,584 A discloses different embodiments of constant velocity fixed joints. According to one embodiment, the outer ball tracks and the inner ball tracks extend concentrically relative to the joint center. The outer and inner spherical faces of the ball cage are axially offset relative to one another. According to a further embodiment, the center of the outer ball track and the center of the inner ball track are axially offset relative to one another on the longitudinal axis. In this embodiment, the outer and the inner spherical face of the ball cage are designed so as to be concentric relative to the joint center.

From DE 39 39 531 C1 a constant velocity fixed joint is known comprising ball tracks composed of two circular arches. In the aligned condition of the joint, an opening angle is formed at the balls. In the articulated condition, the opening angle is zero.

JP 2003021158 A proposes a constant velocity fixed joint whose ball tracks comprise one track portion extending parallel to the longitudinal axis and one adjoining curved track portion.

SUMMARY

A constant velocity joint includes an outer joint part with first and second outer ball tracks, an inner joint part with first and second inner ball tracks, torque transmitting balls which are guided in first and second pairs of tracks, and a ball cage which receives the balls in circumferentially distributed windows and holds same in a common plane when the joint is articulated. In the constant velocity joint, at small articulation angles, only low reaction forces occur between the components which contact one another, any friction forces are low, and at larger articulation angles good cage control properties are ensured.

An advantage of the constant velocity joint is that inside a central portion of the constant velocity joint, i.e. at least in one sectional plane inside the region of the small articulation angle, only low forces occur between the at least one first pair of tracks and the associated ball and the at least one second pair of tracks and the associated ball. This is achieved in that the at least one first pair of tracks of the constant velocity joint inside the central portion at least in one sectional plane, is designed such that a tangent at the first outer ball track and a tangent at the first inner ball track extend parallel relative to one another. Accordingly, this also applies to the at least one second pair of tracks wherein, in at least one sectional plane, two tangents at the respective outer and inner ball tracks in contact with the associated ball extend parallel relative to one another. The term "at least one first pair of tracks" means that one, two, three, four etc. or all pairs of tracks can be provided. This also applies to the second pairs of tracks of which one, two, three, four etc. or all can comprise features disclosed herein. The at least one first pair of tracks and the at least one second pair of tracks have different shapes whose opening angles widen in opposite axial directions. It is understood that each pair of tracks comprises an outer and an inner ball track.

Because of the parallelism of the tangents at the ball tracks and the parallelism of the ball track themselves, the opening angle in said at least one sectional plane in the at least one first and second pair of tracks in the context of this disclosure amounts to 0°, so that there cannot occur any resulting axial forces between the ball tracks and the balls along the ball tracks. This means that the ball cage, too, in this at least one sectional plane inside said central portion, is free from axial forces with reference to the contact faces relative to the outer joint part and the inner joint part respectively. Overall, during the operation of the joint inside the central portion, the friction forces and thus also friction losses are minimised. In contrast to prior art constant velocity joints which comprise an opening angle unequal zero in the aligned condition and which generate friction movements between the outer joint part, the inner joint part and the cage due to the three-point contact between said components, the constant velocity joint features a reduced friction.

In the case of larger articulation angles, i.e. when the constant velocity joint is operated outside the central portion, the design of the ball tracks of the at least one first and second pairs of tracks of said type, i.e. with opening angles of the first and second pairs of tracks widening in opposed axial directions, ensures good cage control conditions. The forces acting from the at least one first pair of tracks on the cage and the forces acting from the at least one second pair of tracks on the cage comprise components which act in opposite directions and thus at least partially eliminate one another. This leads to a balance of forces at the cage and thus to good cage control conditions.

"Opening angles widening in opposed axial directions" means that—if viewed in the joint articulation plane—the first opening angles of the first pairs of tracks widen towards one side of the ball plane and that the second opening angles of the second pairs of tracks widen towards the other side of the ball plane. This includes that the angle bisecting lines of the first opening angle—if viewed in the joint articulation plane—can extend at an angle relative to the angle bisecting lines of the second opening angles. Or, in other words, in the joint articulation plane, a resulting force acting from the first outer and inner ball tracks on a first ball moving towards the attachment end comprises an axial force component which points in an opposite axial direction to that of the resulting axial force component acting, in the joint articulation plane, from the second outer and inner ball tracks on a second ball moving towards the attachment end. This design ensures that the ball cage, at least substantially, is controlled on to the angle bisecting plane. Overall, the present constant velocity joint combines the advantages of lower friction losses with a reliable control function in the case of large articulation angles.

The opening angles are defined between an outer tangent at the outer ball track and an inner tangent at the inner ball track, in each case in the contact region with the respective ball guided in the outer and inner ball track. This applies to both the first outer and inner ball tracks and to the second outer and inner ball tracks. The opening angle refers to the joint plane which is formed by the longitudinal axes of the outer joint part and of the inner joint part, respectively to a pair of tracks containing a ball being positioned in the joint articulation plane. The contact region between the ball and respective ball track can be located directly in the joint articulation plane, more particularly in the case of a circular track cross-section whose radius corresponds to the radius of the ball, or in planes which extend parallel relative to the joint articulation plane and which are formed by the ball contact lines between the ball and ball tracks, for instance in the case of a ball track cross-section which deviates from the circular shape. In the latter case, the projections of the tangents to the respective ball tracks are considered in the joint articulation plane, which projections enclose the opening angle.

In a built-in condition of the joint it can be advantageous if a convoluted boot for sealing the joint chamber is mounted with pre-tension, i.e. such that the convoluted boot generates an axial force which loads the inner joint part and the outer joint part away from one another. Thus, inside the small articulation range, cage control is ensured due to the pre-tension of the convoluted boot. In the pretensioned condition the convoluted boot generates an axial force component which overcomes a play existing between said components. A sudden load change, for example from a torque-free condition to a high torque, does not cause the cage to stop against the inner part and outer part respectively, so that any undesirable noise is avoided. The pretensioning force can range between 30 N and 150 N.

The central portion of the constant velocity, within which for at least one angular position the opening angle equals zero ($\delta=0°$), is more particularly defined by a small joint articulation angle ($\beta_0$) of ±2° around the joint central plane (EM). This means that the joint central portion is defined by the path which is covered by a ball moving along the ball track in the joint articulation plane when the joint rotates under angled conditions at an articulation angle of up to ±2°. The central portion can also be positioned inside a smaller articulation angle of up to ±1° around the joint articulation plane (EM). In any case, the joint central portion and the small articulation angle range, respectively, comprise at least the joint central plane (EM).

The smaller articulation angle range can be adjoined directly by the larger articulation range, i.e. the larger joint articulation range comprises articulation angles ($\beta$) which are positioned outside the small joint articulation range, i.e. which, more particularly, amount to greater than ±1° respectively greater±2° with regard to the absolute value. The articulation angles ($\beta$) of the greater articulation angle range, within which it is proposed that the aperture-side (attachment side) first opening angle of the first pair of tracks widens in a direction which is opposed to the aperture-side (attachment-side) second opening angle of the second pair of tracks, starting from the respective point of transition to the central track portion, amounts to preferably up to at least 20°, more particularly up to at least 30° or even up to 40°.

According to an embodiment it is proposed that when the inner joint part is articulated relative to the outer joint part by a joint articulation angle $\beta$ which is located outside a joint articulation angle of ±2° and inside a joint articulation angle of ±8°, at least one of the aperture-side and attachment-side first opening angles ($\delta Ao$, $\delta Aa$) and at least one of the aperture-side and attachment-side second opening angles ($\delta Bo$, $\delta Ba$) of the at least one second pair of tracks is greater than 0° and smaller than ±8°, more particularly smaller than ±6°. By this design, in the portion directly adjoining the central portion at the aperture end and at the attachment end, an axial force is thus effected to the balls positioned in the joint articulation plane, which leads to good steering or control conditions of the cage. In this articulation angle range $\beta$ of up to ±8°, which adjoins the central portion, because of the relatively small opening angle $\delta$ of a maximum of 8°, the forces acting on the balls are low, which, in an advantageous way, also leads to low friction losses. Said embodiment can apply to the first outer and inner ball tracks and/or to the second outer and inner ball tracks.

When the joint is articulated while rotating, the torque transmitting balls move along the ball tracks and, when viewed in the joint articulation plane, the ball moving towards the attachment end of the outer joint part is guided into an attachment-side track portion of the outer joint part and into an aperture-side track portion of the inner joint part. If viewed in the joint articulation plane, the ball moving towards the aperture end of the outer joint part is guided into an aperture-side track portion of the outer joint part and into an attachment-side track portion of the inner joint part.

The extent of the track portions can also be described via a track angle $\beta/2$ which defines the angle enclosed between a radius around the joint center M through the ball center of one of the torque transmitting balls and the joint central plane EM. In each angular position of the joint, the track angle $\beta/2$ amounts to at least substantially half the joint articulation angle R. However, it cannot be excluded that the balls can also be controlled on to common plane which, to a certain extent, can deviate from the angle-bisecting plane.

According to an embodiment, the ball cage comprises a spherical outer face for guiding the ball cage relative to an inner face of the outer joint part, as well as a spherical inner face for guiding the ball cage relative to an outer face of the inner joint part, wherein between the center of the spherical outer face and the center of the spherical inner face an axial offset is provided. This measure ensures good cage control conditions when the constant velocity joint is articulated.

In an embodiment, a radial play is provided between the spherical outer face of the ball cage and the inner spherical face of the outer joint part and/or between the spherical inner face of the ball cage and the outer spherical face of the inner joint part. This measure ensures that there is provided a certain axial play between the inner joint part and the outer joint part, which, in an advantageous way, ensures that vibrations are uncoupled when the joint is in operation.

When the first balls move along the outer and inner first ball tracks—when viewed in the joint articulation plane—the centers of the first balls define respective first outer center lines A and first inner center lines A'. According to an embodiment it is proposed that the first center lines, along their lengths, each comprise at least two track portions with different curvatures; accordingly, the centers of the second balls, when moving along the outer and inner second ball tracks, each define respective second outer center lines B and first inner center lines B' which, along their lengths, each comprise at least two track portions with different curvatures. Each individual track portion of the at least two track portions with different curvatures can be positioned in any region of the outer and inner ball tracks, i.e. inside the central portion, inside the aperture-side portion and/or inside the attachment-side portion. It is also possible that the first and/or second center lines comprise at least two partial portions with different curvatures inside at least one of the attachment-side track portions or the aperture-side track portion.

Preferably, the first center lines A, A' and/or the second center lines B, B' each comprise a change in curvature in the central track portion, more particularly in the point of intersection with the joint central plane EM. A change of curvature in this context refers to any change in the gradient of the center line in the mathematical sense, such as a change from a circular arch with a greater first radius to a circular arch with a smaller second radius or to a straight line. More particularly, it is also proposed that the curvature changing point is a turning point in the mathematical sense, i.e. the curvature of the track center line changes its algebraic sign in the turning point, for instance from a circular arch with a first direction of curvature to a circular arch with an opposed second direction of curvature. It is understood that the track center line can also be a curve of a higher order, with a "change in curvature" in this case also referring to a change in gradient along the curve of a higher order. Preferably, the first center lines and/or the second center lines each comprise a turning point in the central track portion, more particularly in the point of intersection with the joint central plane.

In the constant velocity joint, at least one of the first and second pairs of tracks comprises the inventive shape with at least one opening angle of zero inside the central portion and with first and second opening angles, opening in different directions, outside the central portion. It is understood that also two or more first, respectively two or more second pairs of tracks can comprise said design. The first and second pairs of tracks are arranged around the circumference, preferably so as to alternate. In an embodiment, all the first pairs of tracks are identical relative to one another and/or all the second pairs of tracks are identical relative to one another.

According to the first embodiment, the at least one first pair of tracks is designed such that at an articulation angle (B) deviating from 0°, an aperture-side first opening angle (δAo) of a first ball moving in the joint articulation plane (EB) towards the aperture end of the outer joint part and an attachment-side aperture angle (δAa) of a first ball moving at the same articulation angle (β) in the joint articulation plane (EB) towards the attachment end of the outer joint part open in opposite directions. Accordingly, the at least one second pair of tracks is designed such that at an articulation angle (β) deviating from 0°, an aperture-side second opening angle (δBo) of a second ball moving in the joint articulation plane (EB) towards the aperture end of the outer joint part and an attachment-side second opening angle (δBa) of a second ball moving at the same articulation angle (β) in the joint articulation plane (EB) towards the attachment-side of the outer joint part open in opposed axial directions. This applies to at least one articulation angle (β) at which the opening angle (δ) is unequal zero, but possibly also to at least all those articulation angles (β) inside the small articulation angle range at which the aperture angle (δ) may deviate from zero, optionally also for articulation angles (β) inside the greater articulation angle range at which an opening angle (δ) is greater than zero.

In this embodiment the first outer ball track can be designed such that the first center line (A) in a first attachment-side track portion and in a first aperture-side track portion of the outer joint part extends radially outside of a first circular arch portion (CRA) defined by a first reference radius (RRA), wherein the first reference radius (RRA) extends from the joint center (M) to a central plane intersection between the first center line (A) and the joint central plane (EM), and wherein the second outer ball track is designed such that the second center line (AB) extends in a second attachment-side track portion and in a second aperture-side track portion of the outer joint part, in each case radially inside a second circular arch portion (CRB) defined by a second reference radius (RRB), wherein the second reference radius (RRB) extends from the joint center (M) to a central plane intersection between the second center line (B) and the joint central plane (EM). (FIGS. 1-3).

The first outer ball track can be designed such that the first center line (A) in the first attachment-side and aperture-side track portion of the outer joint part each comprise at least one of the following: a concave circular arch portion with Radius (R) around a circular arch center which is positioned in the joint central plane (EM) and which, relative to the longitudinal axis of the outer joint part, comprises a radial offset away from the first outer ball track (3.1); a straight portion (3.2); a convex circular arch portion with radius (R) around a circular arch center which is positioned in the joint central plane (EM) and which, relative to the longitudinal axis of the outer joint part, comprises a radial offset towards the second outer ball track.

According to a second embodiment, the at least one first pair of tracks is designed such that at an articulation angle (β) deviating from 0°, an aperture-side first opening angle (δAo) of a first ball moving in the joint articulation plane (EB) towards the aperture end of the outer joint part and an attachment-side opening angle (δAa) of a first ball moving at the same articulation angle (β) in the joint articulation plane (EB) towards the attachment end of the outer joint part open in the same axial direction; and that the at least one second pair of tracks is designed such that at an articulation angle (β) deviating from 0°, an aperture-side second opening angle (δBo) of a second ball moving in the joint articulation plane (EB) towards the aperture end of the outer joint part and an attachment-side second opening angle (δBa) of a second ball moving at the same articulation angle (δ) in the joint articulation plane (EB) towards the attachment end of the outer joint part open in the same axial direction. (FIGS. 4-8).

The first outer ball track is preferably designed such that the first center line (A) in a first attachment-side track portion extends radially inside a first circular arch portion (CRA) which is defined by a first reference radius (RRA), wherein the first reference radius (RRA) around the joint center (M) extends through a central plane intersection between the first center line (A) and the joint central plane (EM) and in a first aperture-side track portion radially outside the first circular arch portion (CRA); wherein the second outer ball track is preferably designed such that the second center line (B) in a second attachment-side track portion extends radially outside a second circular arch portion (CRB) defined by a second reference radius (RRB) and extends in a second aperture-side track portion radially inside the second circular arch portion (CRB), wherein the second reference radius (RRB) around the joint center (M) extends through a central plane intersection between the second center line (B) and the joint central plane (EM).

The first outer ball track can be designed such that the first center line (A) in the first aperture-side track portion of the outer joint part comprises at least one of the following: a concave circular arch portion with radius (R) around a circular arch center which is positioned in the joint central plane (EM) and which, relative to the longitudinal axis of the outer joint part, comprises a radial offset away from the first outer ball track, (8.1); a straight portion (8.2); a convex circular arch portion with radius (R) around a circular arch center which is positioned in the joint central plane (EM) radially outside the first reference radius (RRA), (8.3).

The second outer ball track can be designed such that the second center line (B) in the second attachment-side track portion of the outer joint part comprises one of the following: a concave circular arch portion with the radius (R) around a circular arch center which is positioned in the joint central plane (EM) and which, relative to the longitudinal axis (L12) of the outer joint part comprises a radial offset away from the second outer ball track (8.4); a straight portion (8.5); and a convex circular arch portion with the radius (R) around a circular arch center which is positioned in the joint central plane (EM) radially outside the second reference radius (RRB) (8.6).

Further, the first outer ball track can be designed such that the first center line (A) in the first attachment-side track portion of the outer joint part comprises a circular arch portion with the radius (R) around a circular arch center which is positioned in the joint central plane (EM) and which, relative to the longitudinal axis of the outer joint part, comprises a radial offset towards the first outer ball track; the second outer ball track can be designed such that the second center line (B) in the second aperture-side track portion of the outer joint part comprises a circular arch portion with the radius (R) around a circular arch center which is positioned in the joint central plane (EM) and which, relative to the longitudinal axis of the outer joint part comprises a radial offset towards the second outer ball track (FIG. 8).

Generally, a track portion of the inner joint part, which track portion adjoins the central portion at an aperture side, can be designed in accordance with an attachment-side track portion of the outer joint part. This means that the aperture-side first and second track portions, respectively, of the inner joint part are designed such that the associated center line of said track portion is mirror-symmetrical relative to the center line of the attachment-side first and second track portions, respectively, of the outer joint part with reference to an angle-bisecting plane.

In an advantageous manner, said first and second embodiments combine the advantages of low friction losses at small articulation angles with reliable cage control conditions, respectively cage steering characteristics at larger articulation angles.

While taking into account the specific requirements to be met by the constant velocity joint, the number of pairs of tracks and torque transmitting balls respectively can be selected arbitrarily. The driveline of a motor vehicle is normally provided with constant velocity joints with six, eight or ten balls, but any other number, also an uneven number, is also conceivable.

In view of the manner in which the ball cage is guided relative to the spherical inner face of the outer joint part and the spherical outer face of the inner joint part, the constant velocity joint is provided in the form of a fixed joint which permits displacement movements only in connection with an axial play between the outer joint part and the inner joint part. However, it is also conceivable to design the cage relative to the inner face of the outer joint part and relative to the outer face of the inner joint part so as to be axially free, so that the constant velocity joint would then be designed as a plunging joint.

SUMMARY OF THE DRAWINGS

Exemplary embodiments will be explained below with reference to the drawings wherein

FIG. 2A shows aconstant velocity joint in a second embodiment in an axial view.

FIG. 2B shows the joint according to FIG. 2A along sectional line III-III.

FIG. 2C shows the joint of FIG. 2A along sectional line IV-IV.

FIG. 2D shows the ball cage of the joint in FIG. 2A in a longitudinal section.

FIG. 8 is a diagrammatic view of different designs of the centre lines of a first ball track and of a second ball track of an outer joint part of an inventive constant velocity joint.

DETAILED DESCRIPTION OF EXAMPLE EMBODIMENTS

Figure 1A:
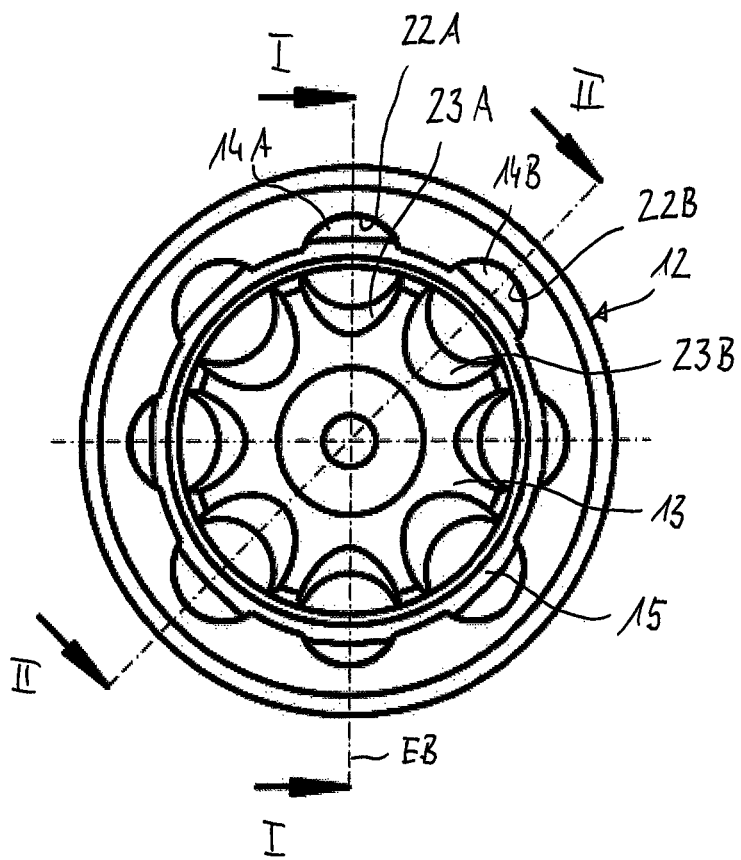
FIG. 1A is a exemplary constant velocity in a first embodiment in an axial view.

FIGS. 1 to 8 will initially be described jointly in respect of the features they have in common. They show a constant velocity joint 11. The constant velocity joint 11 comprises an outer joint part 12, an inner joint part 13, torque transmitting balls 14 and a ball cage 15. The ball cage 15 comprises a spherical outer face 16 which is guided in the outer joint part 12, and a spherical inner cage face 17 which is guided in the inner joint part 13. The balls 14 are held in circumferentially distributed cage windows 18 in the ball cage 15 in the joint central plane EM. The outer joint part 12 is shown to comprise a longitudinal axis L12 and the inner joint part 13 comprises a longitudinal axis L13. The point of intersection of the longitudinal axes L12, L13 with the joint central plane EM forms the joint center M.

Between the spherical outer face 16 of the ball cage 15 and a spherical inner face of the outer joint part 12 there is provided a small amount of play. The same applies to the paired faces between the spherical inner face 17 of the ball cage 15 and a spherical outer face of the inner joint part 13. Because of the radial play between the paired faces of the ball cage 15 and the outer joint part 12 and the inner joint part 13 respectively, axial movements of the inner joint part 13 relative to the outer joint part 12 are possible to a limited extent. The resulting axial play between the inner joint part 13 and the outer joint part 12 allows in an advantageous way for vibrations to be uncoupled when the joint is operation. The axial play can range between 0.2 millimeters (mm) and 1.0 mm, for example.

The outer joint part 12 comprises a base 19 connected to an attaching journal 24, as well as an aperture 20 through which the inner joint part 13 can be mounted. Thus, the aperture can also be referred to as opening, and the aperture-side can be described as opening-side, respectively. The inner joint part 13 comprises an aperture 21 into which the journal of a driveshaft can be inserted in a rotationally fixed way for transmitting torque. The position of the base 19 indicates the axial direction "towards the attachment side" and the position of the aperture 20 indicates the axial direction "towards the aperture side". Said terms are also used with reference to the inner joint part 13, with the axial connection of a shaft to the inner joint part 13 not being taken into account. It is understood that the outer joint part, instead of comprising a base, can also remain open towards the attachment end, as is the case with a disc joint for instance.

The outer joint part 12 comprises first and second outer ball tracks 22A, 22B, and the inner joint part comprises first and second inner ball tracks 23A, 23B. In each case, an outer first ball track 22A and a respective inner first ball track 23A are positioned opposite one another and jointly form a pair of tracks in each of which a first torque transmitting ball 14A is guided. Accordingly, in each case an outer second ball track 22B and a respective opposed inner second ball track 23B form a second pair of tracks 22B, 23B in each of which a second torque transmitting ball 14B is guided. The first pairs of tracks 22A, 23A and the second pairs of tracks 22B, 23B, which comprise different track shapes, are alternately arranged across the circumference. The specific track shapes will be dealt with in greater detail below. The balls 14A, 14B are identical and are jointly referred to by "14".

The opposed outer and inner ball tracks 22, 32 can be positioned in radial planes around the respective longitudinal axis L12, L13. The radial planes are arranged at the same angular distance from one another. However, it is also conceivable for each two circumferentially adjoining pairs of tracks to extend in planes which extend parallel relative to one another and which extend parallel to the longitudinal axis L12, L13. This design is also referred to a "twin-ball" joint. When the joint is articulated, i.e. in the case of angular movements of the inner joint part 13 relative to the outer joint part 12, the balls 14 are guided out of the joint central plane EM at least approximately into the angle-bisecting plane between the longitudinal axis L12 of the outer joint part 12 and the longitudinal axis L13 of the inner joint part 13. "At least approximately" is meant to say that the plane formed by the ball centers of the balls 14 is positioned inside an angle range of ±10% around the angle-bisecting plane and, more particularly, can correspond to same.

The first and second balls 14, in the outer joint part 12, are each in contact with the associated first and second outer ball tracks 22, and, in the inner joint part, with the associated first and second inner ball tracks 23. The first balls 14A, in the longitudinal section, form an outer first contact line KA in the region of contact with the outer first ball tracks 22A, and, in the contact region with the inner first ball tracks 23A form an inner first contact line KA'. Accordingly, the second balls 14B, in the region of contact with the outer and inner second ball tracks 22B, 23B form outer and inner second contact lines KB, KB'. In the longitudinal sections, the balls 14 are each shown to be in contact in the track base of the ball tracks 22, 23, which contact however does not necessarily have to exist. Thus, the outer and inner contact line K, K', as illustrated, can be positioned in the track base, i.e. in a radial plane which contains the longitudinal axes L12, L13, or in planes which extend parallel to the longitudinal axes L12, L13. When the first balls 14A move along the outer and the inner ball tracks 22, 23, the centers of the first balls 14A define respective first center lines A, A'. Accordingly, the centers of the second balls 14B, when these move in the second pairs of tracks 22B, 23B, define respective second center lines B, B'. The center lines A, A'; B, B' extend parallel to the respective contact line KA, KA'; KB, KB'. For describing the ball tracks 22A, 23A; 22B, 23B, reference is made either to the contact lines KA, KA'; KB, KB' in the track base or to the center lines A, A'; B, B' which are defined by the sum of the ball centers during angular movements of the joint. The first ball center line A refers to the line of the ball centers of the first balls 14A along the outer first ball tracks 22B in the outer joint part 12, and A' refers to the ball center line of the associated inner first ball tracks 23A in the inner joint part 13. Accordingly, the second ball center line B refers to the line of the ball centers of the second balls 14B along the outer second ball tracks 22B in the outer joint part 12, and B' to the ball center line of the associated inner second ball tracks 23B in the inner joint part 13.

In the aligned position of the joint, i.e. when the outer joint part 12 and the inner joint part 13 extend coaxially (articulation angle β=0°), the tangents TA, TA'; TB, TB' at the associated balls 14 in the contact points with the outer and inner first and second ball tracks 22A, 23A, 22B, 23B extend parallel to the respective longitudinal axis L12, L13. Because the tangents T, T' in this central portion of the joint, which portion comprises at least the joint central plane EM, extend parallel relative to one another, the opening angle δ amounts to zero, which is meant to include opening angles being substantially zero, due to unavoidable production tolerances. The constant velocity joint 11 is thus axially load-free in this small articulation angle range, i.e. in this region, substantially no forces occur between the ball tracks 22, 23 and the balls 14 guided therein.

Below, there will follow a description of features of the present constant velocity joint, more particularly of the design of the ball tracks. In particular, the following definitions apply in connection with the present constant velocity joint and the design of the ball tracks:

The tangent angle α defines the angle which is enclosed between a tangent T, T' to a center line A, A' respectively to a contact line K, K', of the outer joint part 12 or inner joint part 13 in any track point, and the respective longitudinal axis L12, L13 of the outer joint part 12 or the inner joint part 13.

The joint articulation angle β defines the angle which is enclosed between the longitudinal axis L12 of the outer joint part 12 and the longitudinal axis L13 of the inner joint part. In an aligned joint, the joint articulation angle β is zero (β=0°).

The track angle β/2 defines the angle which is enclosed between the joint central plane EM and a radius around the joint center M to the ball center of a torque transmitting ball 14. The track angle β/2 in each angular position of the joint amounts to at least approximately half the joint articulation angle R.

The track portion angle γ of a circular-arch-shaped track portion defines the angle across which said circular-arch-shaped track portion having a constant radius R extends around the radius center M of said radius R.

The opening angle δ defines the angle which is enclosed between the tangent T to the outer ball track and the tangent T' to the inner ball track in the respective contact points with the respective ball 14 guided in said pair of tracks. It is understood that this definition for the opening angle δ applies for both, the first pairs of tracks and the second pairs of tracks.

The center plane EM is defined by the ball centers of the torque transmitting balls 14 in an aligned joint.

The reference radius RRA (RRB) for the ball center line A (B) of the outer joint part 12 and, respectively, for the ball center line A' (B') of the inner joint part 13 is defined from the joint center M to a center plane intersection point PE between the respective center line A, A' (B, B') and the joint central plane EM.

The reference radius RRA (RRB) for the center line A, A' (B, B') defines a reference circular arch CRA (CRB).

Figure 1N:
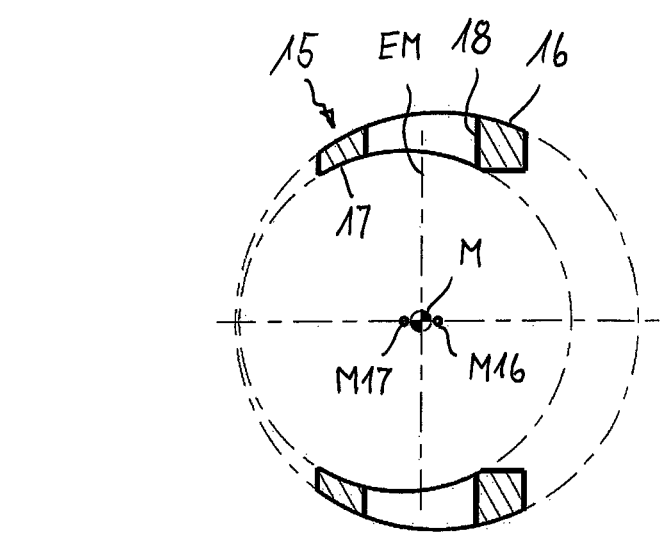
FIG. 1N shows the ball cage of the joint of FIG. 1A in a longitudinal section.
Figure 1B:
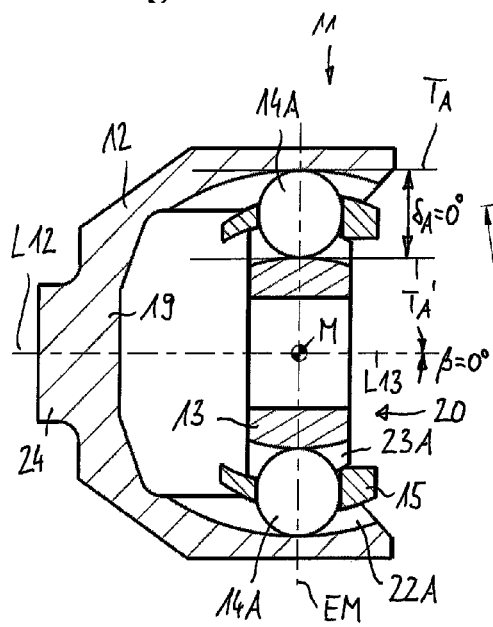
FIG. 1B shows the joint of FIG. 1A along sectional line I-I in an aligned condition (articulation angle 0°).

FIGS. 1A to 1N show a first embodiment of a constant velocity joint 11. In FIGS. 1B, 1C, 1F, 1G, 1H it is possible to see the outer and inner first ball tracks 22A, 23A. FIGS. 1D, 1E, 1J, 1K, 1M show the outer and inner second ball tracks 22B, 23B, respectively. As can be seen in FIG. 1A, the first and second pairs of tracks alternate around the circumference. Thus, in the present embodiment with eight balls, each two first pairs of tracks 22A, 23A are diametrically opposed relative to one another, which, accordingly, also applies to the second pairs of tracks 22B, 23B. All first tracks 22A, 23A are identical to one another and all second ball tracks 22B, 23B are identical relative to one another. FIG. 1F shows the center line A and contact line KA of the outer first ball track 22A of the outer joint part 12, which extend parallel relative to one another. Starting from the aperture end 20 towards the attachment end 19 in the sequence as given, the first center line A of the outer joint part 12 comprises an aperture-side portion Ao which extends from the aperture side of the outer joint part 12 towards the attachment end; a central portion Az continuously adjoining the aperture-side portion Ao; and an attachment-side portion Aa continuously adjoining the central portion Az.

Figure 1C:
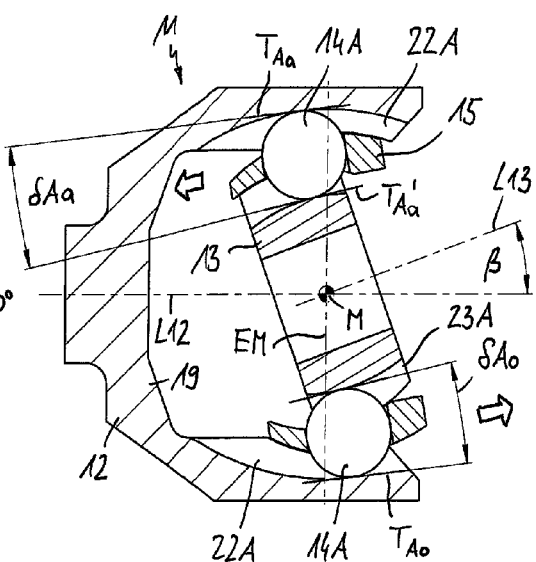
FIG. 1C shows the joint of FIG. 1A along sectional line I-I articulated by 20°.
Figure 1D:
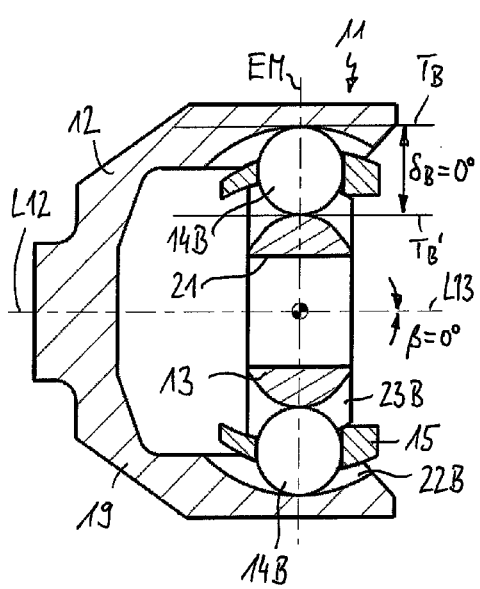
FIG. 1D shows the joint of FIG. 1A along sectional line II-II in an aligned condition.
Figure 1E:
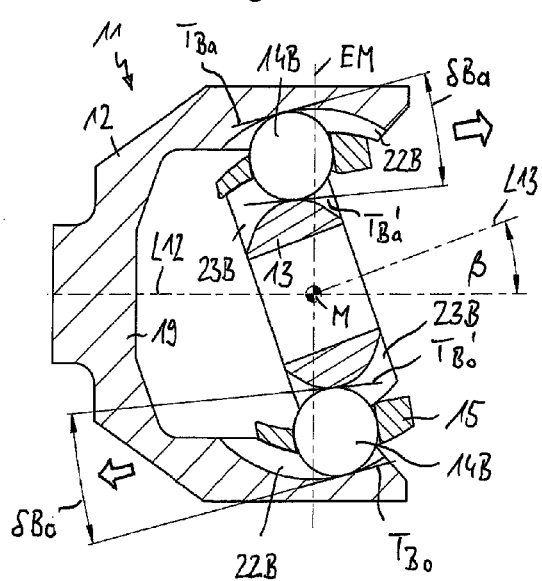
FIG. 1E shows the joint of FIG. 1A along sectional line II-II articulated by 20°.
Figure 1F:
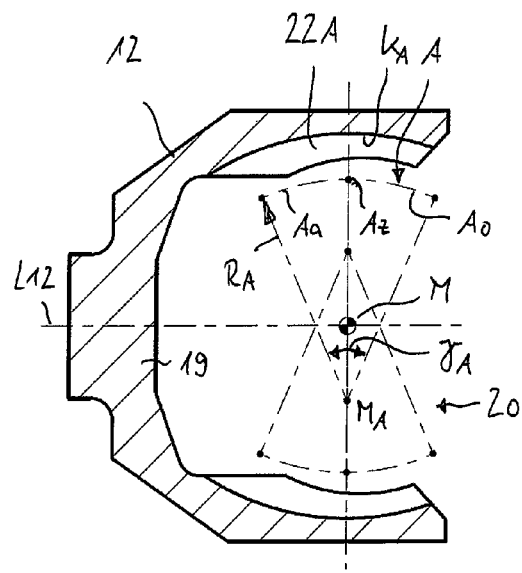
FIG. 1F shows the outer joint part of the joint of FIG. 1A along sectional line I-I.
Figure 1H:
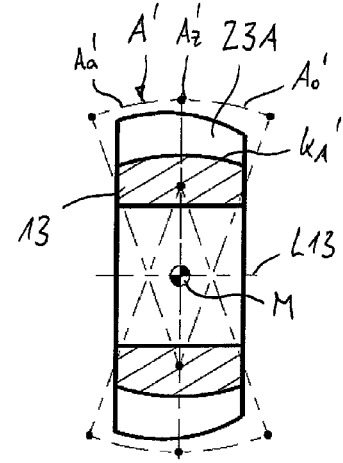
FIG. 1H shows the inner joint part of the joint of FIG. 1A along sectional line I-I.

Accordingly, the center line A' of the inner joint part 13, which can be seen in FIG. 1H, starting from the aperture side towards the attachment side, in the sequence as given, comprises an aperture-side portion Ao'; a continuously adjoining central portion Az' and a continuously adjoining attachment-side portion Aa'.

The central track portion 22Az of the outer first ball track 22A and the central track portion 23 Az of the inner first ball track 23A are positioned inside a joint articulation angle range β of ±2° around the joint central plane EM and contain at least the sectional region with the joint central plane EM. Accordingly, this applies to the central track portions 22Bz, 23Bz of the outer and inner second ball tracks 22B, 23B. More particularly, it can be seen in FIG. 1B that an outer first central contact line tangent TA to the outer first contact line KA inside the outer central track portion extends parallel to an inner first central contact line tangent TA' at the inner first contact line KA' inside the inner central track portion. Accordingly, an outer second central contact line tangent TB at the outer second contact line KB inside the central track portion extends parallel to an inner second central contact line TB' at the inner second contact line KB' inside the central track portion. As a result of this design, substantially no axial forces whatsoever act from the first and second ball tracks 22A, 23A; 22B, 23B on to the balls 14, which has a friction-reducing effect. The opening angle δ enclosed between the central contact line tangents TA, TA' and TB, TB', respectively, in at least one point inside said central track portions 22Az, 23Az and respectively 22Bz, 23Bz equals zero (δ=0°).

FIGS. 10 and 1E show the constant velocity joint in an angled position at an articulation angle β of approximately 20°, with FIG. 1C showing a longitudinal section through the first ball tracks 22A, 23A, whereas FIG. 1E shows a longitudinal section through the second ball tracks 22B, 23B. It can be seen that the outer and inner first and second ball tracks 22, 23 are designed such that, in the joint articulation plane EB, both at the ball 14o moving from the central joint plane EM towards the aperture end 20 (lower half of the Figure) and at the ball 14A moving from the central joint plane EM towards the attachment end (upper half of the Figure), there are generated opening angles δ which are unequal zero.

The first pair of tracks 22A, 23A is designed such that an aperture-side first opening angle δAo of a first ball 14A moving in the joint articulation plane EB towards the aperture end of the outer joint part 12 and an attachment-side opening angle δAa of a first ball 14A moving at the same articulation angle β in the joint articulation plane EB towards the attachment end 19 of the outer joint part 12 open in opposite axial directions (FIG. 1C). The forces acting from the first ball tracks 22A, 23A via the balls on to the ball cage effect a moment in a first direction of rotation, which is indicated by the arrows (in the present case anti-clockwise).

The second pair of tracks 22B, 23B is also designed such that in the case of an articulation angle β deviating from 0°, an aperture-side second opening angle δBo of a second ball 14B moving in the joint articulation plane EB towards the aperture end and an attachment-side second aperture angle δBa of a second ball 14B moving towards the attachment end open in opposed axial directions. However, the opening angles δBo, δBa of the second ball tracks 22B, 23B open in axial directions opposed to those of the opening angles δBo, δBa of the first ball tracks 22A, 23A. This means that the forces acting from the second ball tracks 22B, 23B generate a moment (in the present case in the clockwise direction) which acts against the moment generated by the forces of the first ball tracks 22A, 2A. Thus, overall, the resulting axial forces acting from the first and second balls 14A, 14B on to the ball cage 15 at least largely eliminate one another, which has a friction-reducing effect.

Said behaviour can apply to all those articulation angles β within the small articulation angle range at which the opening angle δ deviates from zero, preferably also for articulation angles β outside the small articulation angle range, respectively inside the larger articulation angle range that directly adjoins the small articulation angle range and includes articulation angles of up to at least 20°, preferably of up to 40°. At articulation angles being within the large joint articulation angle range, the opening angle δ is unequal zero, in particular can have a value greater than zero and smaller than eight degrees. This design ensures good cage control conditions, more particularly also at large articulation angles R. In the case of articulation angles in excess of 40°, it is theoretically also conceivable to use opening angles which deviate from said design.

The opening angles δ are each enclosed by an outer contact line tangent T to the outer contact line K at the respective ball 14 and by an inner contact line tangent T' to the inner contact line K' of said ball 14. Said outer and inner contact line tangents T, T' each extend through a respective contact point between the ball 14 and the respective outer and inner ball track. For an articulation angle β of 20° there is obtained at the ball 14o moving in the joint articulation plane towards the aperture end 20 an aperture-side first opening angle δAo, whereas at the ball 14A moving in the joint articulation plane towards the attaching end, an attachment-side opening angle δAo is formed. At larger articulation angles β of 40° for example, the opening angles δAo at the aperture-side ball and the opening angles δAa at the attachment-side ball are greater than in the case of an articulation angle of 20°. This applies in the same way to the second pairs of tracks 22B, 23B. As compared to prior art fixed joints, said opening angles δ are comparatively small, which leads to lower friction losses between the components moving relative to one another. The first and second pairs of tracks 22A, 23A; 22B, 23B are preferably designed such that at a given articulation angle β, the aperture-side and attachment-side opening angles of a pair of tracks are at least approximately identical in size. However, a certain deviation in size of the aperture-side and attachment-side opening angles δ of a pair of tracks at a predetermined articulation angle β is permissible, for example in the range of up to ±10%.

Figure 1J:
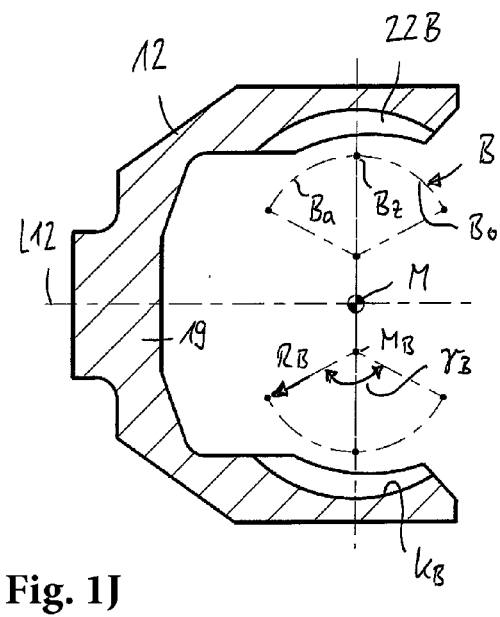
FIG. 1J shows the outer joint part of the joint of FIG. 1A along sectional line II-II.
Figure 1M:
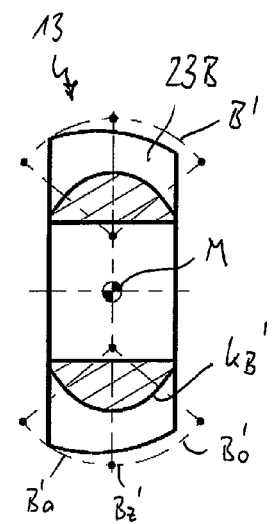
FIG. 1M shows the inner joint part of the joint of FIG. 1A along sectional line II-II.
Figure 1G:
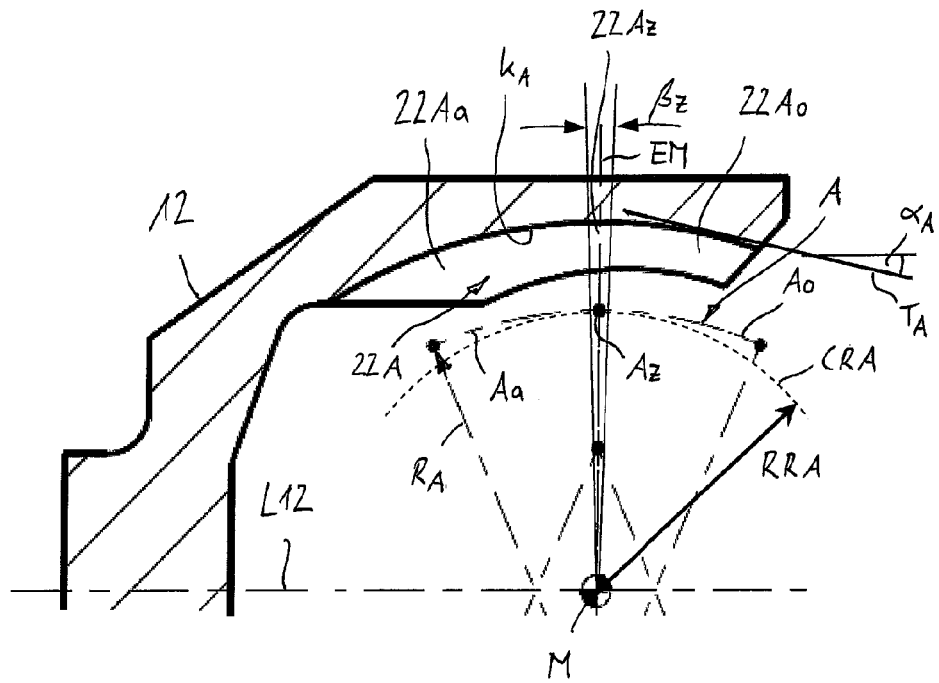
FIG. 1G shows a portion of the outer joint part of FIG. 1F with further details.

FIGS. 1F and 1G show further details of the track shape of the outer first ball tracks 22A of the outer joint part 12. The reference radius RRA has a radius center positioned in the joint center M and an end (perimeter) defined by the point of intersection between the center line A and the joint central plane EM. The individual track portions 22Ao, 22Az, 22Aa and the center line portions Ao, Az, Aa, respectively, are characterised by their different curvatures and radii respectively.

The first center line A is formed by a circular arch with a uniform radius RA around a center MA, which radius is greater than the reference radius RRA. The center MA of the center line A is positioned in the joint central plane EM and, relative to the longitudinal axis L12, is offset away from the outer ball track 22. It is understood that the center line A can also be provided in a form other than a radius, for example by an elliptical line. In the central track portion Az, i.e. exactly in the joint central plane EM, the center line touches reference radius RRA. As can be seen in FIG. 1B, the tangent TA located in said point at the center line A extends parallel to the longitudinal axis L12. In the aperture-side and attachment-side portions axially adjoining the joint central plane EM, the first center line A of the outer joint part 12 extends radially outside the first reference radius RRA.

FIG. 1H shows the inner joint part 13 of the inventive constant velocity joint in the form of a detail in a longitudinal section through two opposed ball tracks 23A. A ball center line A' of the first ball tracks 23A of the inner joint part 13 is complementary to a ball center line A of the first ball tracks 22A of the outer joint part 12. This means that the first ball center line A' of the inner joint part 13 is mirror-symmetrical to the first ball center line A of the outer joint part 12 with reference to the joint central plane EM and, respectively, with reference to the angle-bisecting plane between the longitudinal axis L12 of the outer joint part 12 and to the longitudinal axis L13 of the inner joint part 13.

To avoid any repetition as regards the shape of the first ball center lines A' of the inner joint part 13, reference is made to the explanations given in connection with the description of the first ball tracks 22A of the outer joint part 12.

Figure 1K:
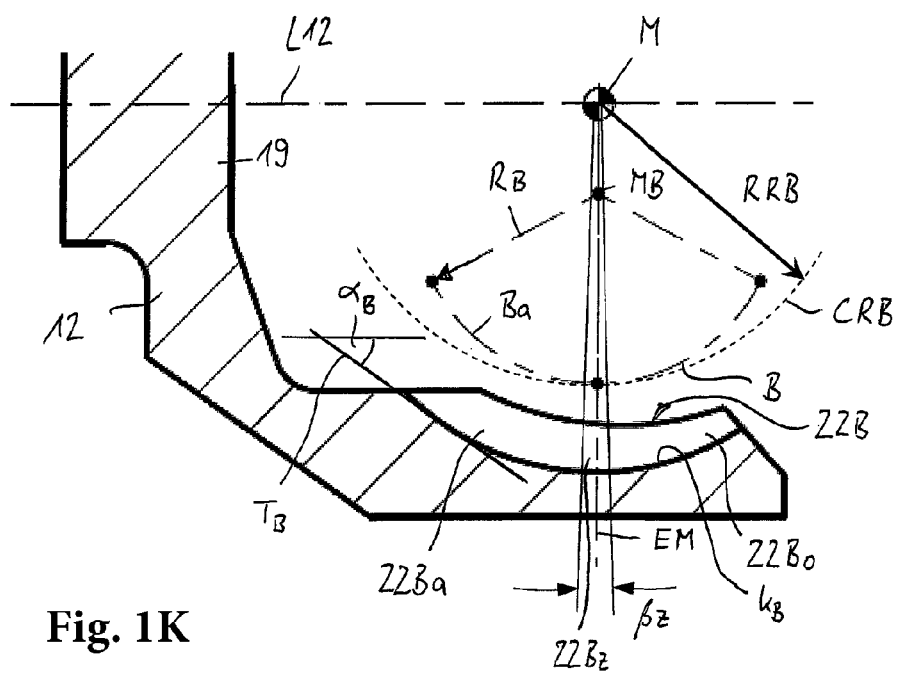
FIG. 1K shows a portion of the outer joint part of FIG. 1J with further details.

FIGS. 1J and 1K show further details of the track shape of the outer second ball tracks 23B of the outer joint part 12. It is shown the reference radius RRB having a radius center positioned in the joint center M and an end (perimeter) defined by the point of intersection between the center line B and the joint central plane EM. The individual track portions 22Bo, 22Bz, 22Ba and, respectively, the individual center line portions Bo, Bz, Ba are also shown.

The second center line B is formed by a circular arch with a uniform radius RB around a center MB, which radius RB is smaller than the second reference radius RRB. The center MB of the center line B is positioned on the joint central plane EM and is offset from the longitudinal axis L12 towards the outer ball track 22. It is understood that the center line B can also be provided in a form other than a circular arch with a uniform radius, for instance by an elliptical line. In the central track portion Bz, i.e. exactly in the joint central plane EM, the second center line B touches the reference radius RRB. As can be seen in FIG. 1D, a tangent TB located in said point at the center line B extends parallel to the longitudinal axis L12. In the aperture-side and attachment-side portions, which axially adjoin the joint central plane EM, the second center line B of the outer joint part 12 extends radially inside the second reference radius RRB.

FIG. 1M shows the inner joint part 13 of the constant velocity joint 11 in the form of a detail in a longitudinal section through two opposed second ball tracks 23B. A ball center line B' of the second ball tracks 23B of the inner joint part 13 is complementary to a ball center line B of the second ball tracks 22B of the outer joint part 12. This means that the second ball center line B' of the inner joint part 13 is mirror-symmetrical relative to the second ball center line B of the outer joint part 12 with reference to the joint central plane EM and, respectively, with reference to the angle-bisecting plane between the longitudinal axes L12 and L13.

To avoid any repetition as regards the shape of the second ball center lines B' of the inner joint part 13, reference is made to the explanations given in connection with the description of the second ball tracks 22B of the outer joint part 12.

FIG. 1N shows the ball cage 15 in the form of a detail. It can be seen that the first surface center M16 of the spherical face 16 and the second surface center M17 of the spherical face 17 each comprise an axial offset with reference to the joint central plane EM in opposed directions away from the joint central plane EM. As a result of the cage offset, the degree of wrapping of the balls 14 in the attachment-side track portions of the inner and outer ball tracks 22, 23 is increased.

FIGS. 2A to 2D, which will be described jointly below, show a constant velocity joint 11 in a further embodiment which largely corresponds to the constant velocity joint 11 according to FIGS. 1A to 1M, so that, as far as features they have in common are concerned, reference is made to the above description. Identical or corresponding components have been given the same reference numbers.

The only difference consists in that the spherical inner face of the outer joint part 12 and the spherical outer face 16 of the ball cage 15 extend concentrically relative to the joint center M. Accordingly, the pairing of spherical faces between the ball cage 15 and the inner joint part 13 is also concentrically relative to the joint center M. In other words, the constant velocity joint 11 according to the present embodiment does not comprise a so-called cage offset. As a result, the attachment-side track portions of the outer and inner first and second ball tracks 22A, 23A; 22B, 23B comprise smaller track depths and therefore, in a cross-sectional view, smaller wrap angles around the balls 14 received in the tracks. Furthermore, the tangent angles at the contact lines, respectively at the center lines of the ball tracks are somewhat smaller. Otherwise, the joint according to FIGS. 2A to 2D corresponds to the above-mentioned embodiment, so that, to that extent reference is made to the above description.

The two embodiments shown in FIGS. 1A to 1N and in FIGS. 2A to 2 have in common that the center lines A of the first outer ball tracks 22A of the outer joint part 12 at the aperture side and at the attachment side are positioned outside the reference radius RRA, whereas the center lines B of the second outer ball tracks 22B of the outer joint part 12 at the aperture side and at the attachment side extend inside the reference radius RRB. This principle can also be put into effect by various other track shapes.

Figure 3:
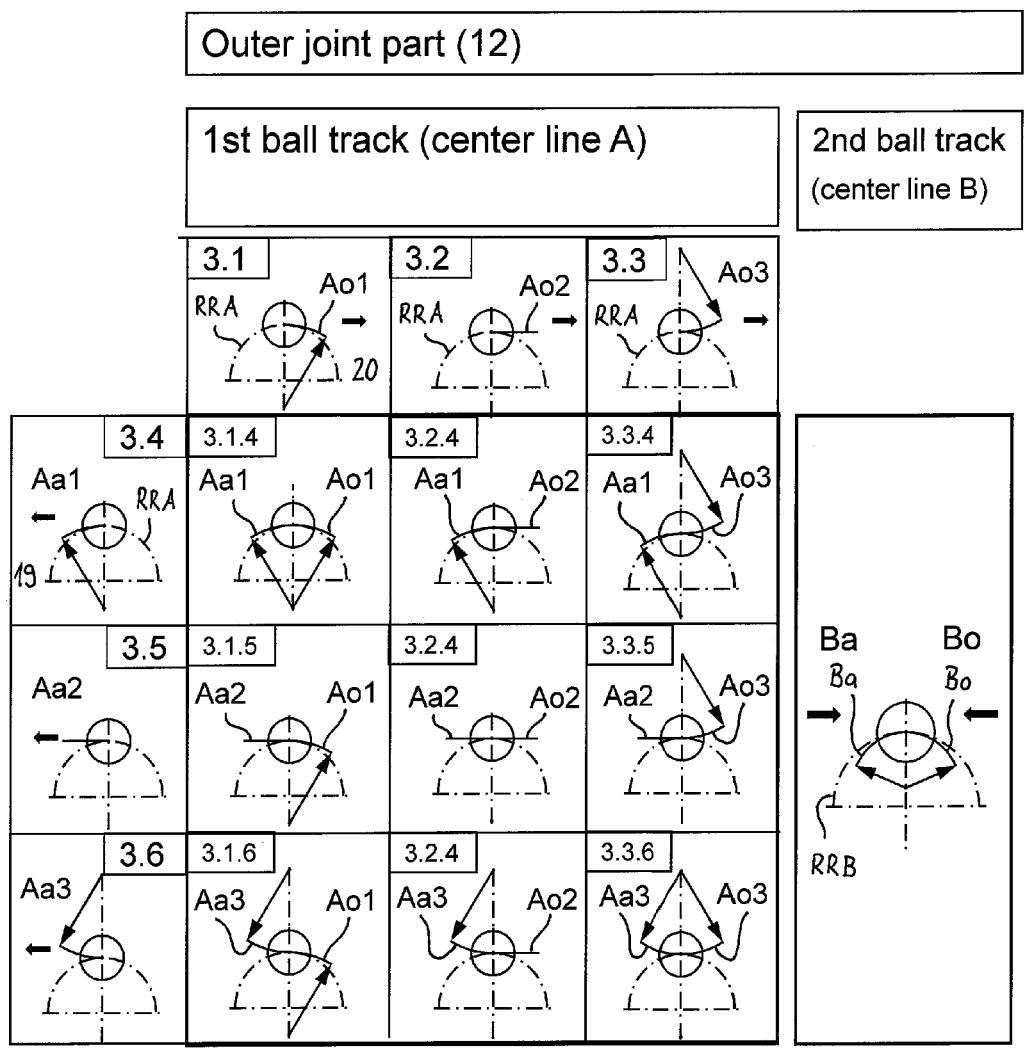
FIG. 3 is a diagrammatic illustration of different designs of the center line of a first ball track and of a second ball track of an outer joint part of a constant velocity joint.

For an outer joint part FIG. 3 shows diagrammatic illustrations of various designs of center lines A of first ball tracks 22A as well as a possible center line B of a second ball track 22B. This results in different possible combinations of different embodiments of constant velocity joints.

In boxes 3.1, 3.2 and 3.3 there are shown different designs of aperture-side portions Ao of the center line A of the outer first ball tracks 22A. Box 3.1 shows an aperture-side portion Ao1 which is formed by a circular arch having a greater radius than the reference radius RRA. Such a design is present in the embodiments according to FIGS. 1 and 2. Box 3.2 shows an aperture-side portion Ao2 of a center line which is formed by a straight line. The aperture-side straight portion Ao2, in the joint central plane EM towards the aperture end 20, tangentially adjoins the reference radius RRA. Box 3.3 shows the aperture-side portion Ao3 of a further conceivable center line A. In this case, the aperture-side portion Ao3 is formed by a circular arch with a convex curvature whose center is located in the joint central plane EM radially outside the reference radius RRA.

Boxes 3.4, 3.5 and 3.6 show different designs of attachment-side portions Aa of the center line A. Box 3.4 shows a first possible attachment-side portion Aa1 which is formed by a circular arch whose radius is larger than the reference radius RRA. Such a design is present in the embodiments according to FIGS. 1 and 2. Box 3.5 shows a second design for the attachment-side portion Aa2 which is formed by a straight line which, in the joint central plane EM, tangentially adjoins the reference radius RRA and extends towards the attaching end 19. Box 3.6 shows a further design of an attachment-side portion Aa3 which, in this case, is formed by a circular arch with a convex curvature whose center is positioned in the joint central plane EM radially outside the reference radius RRA.

Each of the embodiments for an aperture-side portion Ao of the outer first ball track 22A as shown in boxes 3.1, 3.2 and 3.3 can be combined with each of the embodiments for the attachment-side portion Aa of the outer first ball track 22A as shown in boxes 3.4, 3.5 and 3.6. This results in the matrix as shown, with nine different track shapes for the center line A of the outer first ball tracks 22A which are shown in boxes 3.1.4, 3.1.5, 3.1.6, 3.2.4, 3.2.5, 3.2.6, 3.3.4, 3.3.5 and 3.3.6.

On the right-hand side of FIG. 3 there is shown the center line B of the outer second ball track 22B, which, in turn, can be combined with each of the designs shown in said nine boxes. Box 3.1.4 shows the first outer ball track center line A having a concave circular arch portion Aa1, Ao1 with a radius around a circular arch portion center which is positioned in the joint central plane and which, relative to the longitudinal axis of the outer joint part, comprises a radial offset away from the first outer ball track Aa1, Ao1. Box 3.2.4 discloses a straight portion Ao2 of the first outer ball track center line A. Box 3.3.6 shows the first outer ball track center line A having a convex circular arch portion Aa3, Ao3 with a radius around a circular arch center which is positioned in the joint central plane radially outside the first reference radius. Furthermore, it can be seen in FIG. 3 that the second ball track B is designed such that the second center line in the second attachment-side track portion Ba and aperture-side track portion Bo of the outer joint part comprises a circular arch portion with the radius around the circular arch center which is positioned in the joint central plane and which, relative to the longitudinal axis of the outer joint part, comprises a radial offset towards the second outer ball track.

It is understood that the track shape of the outer first and second ball tracks 22A, 22B and, accordingly, also the track shapes of the inner first and second pairs of track 23A, 23B can also be formed in ways other than the partial portions shown. For instance, each of the track portions Ao, Aa, Bo, Ba as shown can also have a shape which deviates form a circular arch or straight line respectively, such as an elliptical, spiral and/or hyperbolic shape and, respectively, a mathematical function of a higher order.

FIGS. 4A to 4G which will be described jointly below show a constant velocity joint in a third embodiment which largely corresponds to the constant velocity joint shown in FIGS. 1A to 1N) so that, as regards the features they have in common, reference is made to the above description, with identical components, respectively components corresponding to one another, having the same reference numbers.

Figure 4A:
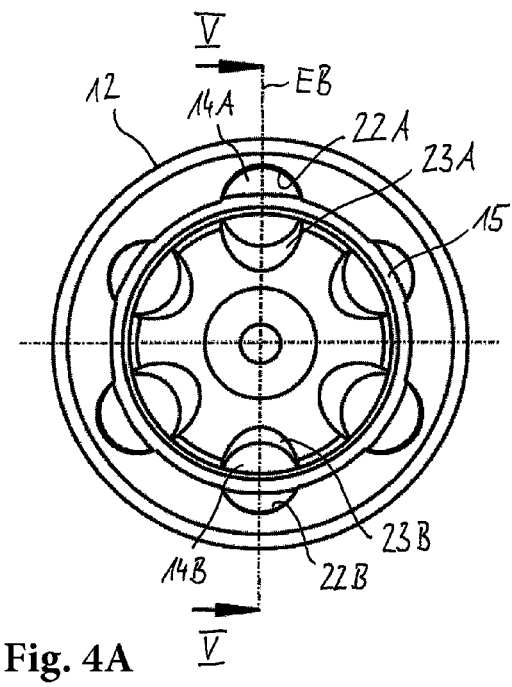
FIG. 4A shows a constant velocity joint in a further embodiment in an axial view.
Figure 4B:
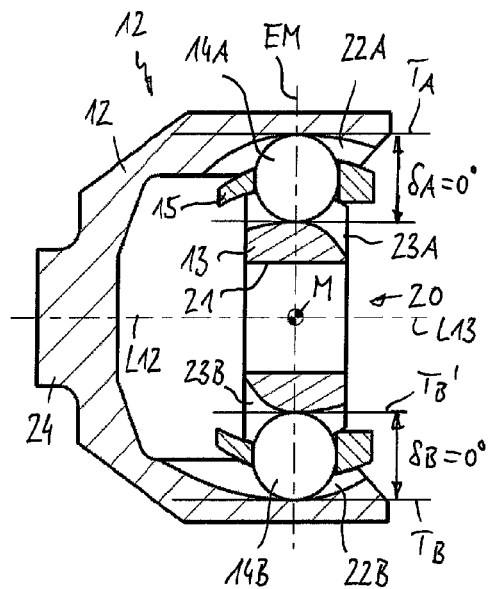
FIG. 4B shows the joint of FIG. 4A along sectional line V-V in an aligned condition (articulation angle 0°).

It can be seen in FIG. 4A that the present joint comprises six pairs of tracks and six torque transmitting balls 14. There are provided three first pairs of tracks 22A, 23A and three second pairs of tracks 22B, 23B which are alternately arranged around the circumference. The total of six pairs of tracks means that each first pair of tracks is located diametrically opposite a second pair of tracks 22B, 23B, which can be seen for instance in FIG. 4B.

Figure 4C:
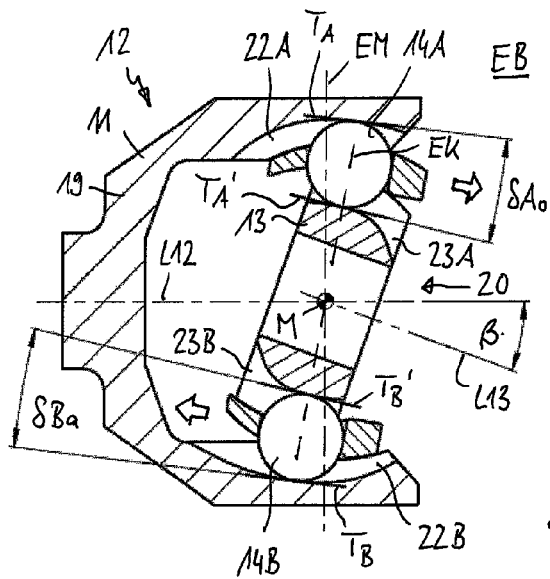
FIG. 4C shows the joint of FIG. 4A along sectional line V-V articulated by +20°.
Figure 4D:
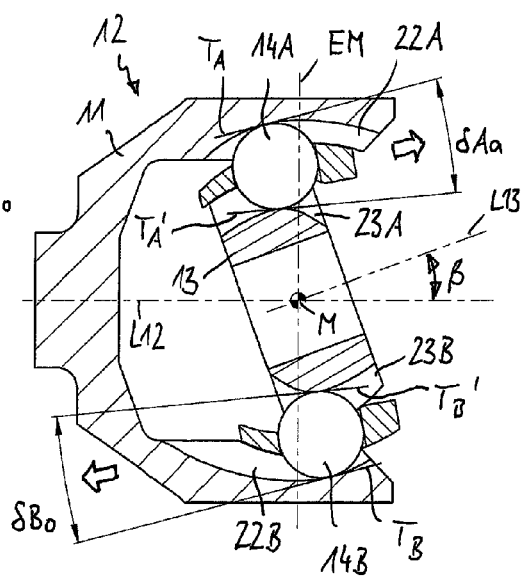
FIG. 4D shows the joint of FIG. 4A along sectional line V-V articulated by −20°.
Figure 4E:
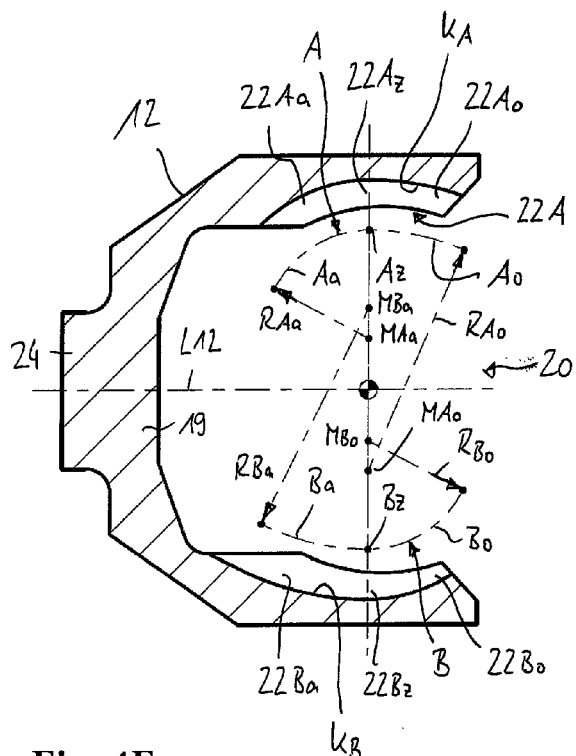
FIG. 4E shows the outer joint part of the joint of FIG. 4A along sectional line V-V.

The first center line A of the outer joint part 12 visible in the upper half of FIG. 4E, starting from the aperture side 20 towards the attaching side 19 in the sequence as given, comprises an aperture-side portion Ao which extends from the aperture side of the outer joint part 12 towards the attaching side; a central portion Az continuously adjoining the aperture-side portion Ao; and an attachment-side portion Aa which continuously adjoins the central portion Az. Accordingly, the center line A' of the inner joint part 13 which can be seen in the upper half of FIG. 4F, starting from the aperture side 20 and extending towards the attachment side 19 in the sequence as given, comprises an aperture-side portion Ao'; a continuously adjoining central portion Az' and a continuously adjoining attachment-side portion Aa'.

The second center line B of the outer joint part 12 comprising an aperture-side portion Bo, a central portion Bz and an attachment-side portion Ba can be seen in the lower half of FIG. 4E. The associated center line B' of the inner joint part 13 can be seen in the lower half of FIG. 4F.

Special features of the present embodiment are as follows: the first pair of tracks 22A, 23A is designed such that an aperture-side first opening angle δAo of a first ball 14A moving in the joint articulation plane EB towards the aperture side 20 of the outer joint part 12 and an attachment-side opening angle δAa of a first ball 14A moving at the same articulation angle β in the joint articulation plane EB towards the attachment side 19 of the outer joint part 12 open in the same axial direction (FIGS. 4C and 4D). The forces which act from the first ball tracks 22A, 23A via the balls 14A on to the ball cage 15, which are illustrated by arrows, apply a resulting axial force in a first axial direction (in the present case towards the aperture end 20).

The second pair of tracks 22B, 23B is also designed such that in the case of an articulation angle β deviating from 0°, an aperture-side second opening angle δBo of a second ball 14B moving in the joint articulation plane EB towards the aperture end 20 and an attachment-side second opening angle δBa of a second ball moving towards attachment end 19 open in the same axial direction. However, the opening angles δBo, δBa of the second ball tracks 22B, 23B open in opposed axial directions relative to the opening angles δAo, δAa of the first pairs of ball tracks 22A, 23A. This means that the forces which act from the second ball tracks 22B, 23B via the balls 14B on to the cage 15, which are indicted by arrows, generate a resulting axial force (in the present case towards the attaching end 19), which resulting force acts against the resulting axial force of the forces generated by the first ball tracks 22A, 23A. Thus, overall, the resulting axial forces acting from the first and second balls 14A, 14B on to the ball cage 15 at least substantially compensate each other, which leads to a reduction in friction.

Said behaviour can apply to all those articulation angles β within the small articulation range of particularly up to ±2° for which the opening angle δ deviates from zero, preferably also to articulation angles β outside the small articulation angle range, respectively inside the larger articulation angle range wherein the opening angle δ is unequal zero, of up to at least 20°, preferably of up to 40°. This design ensures good cage control conditions, even at larger articulation angles β. With larger articulation angles in excess of 40°, it is theoretically also conceivable to use opening angles which deviate from said design. As far as further details of opening angles are concerned, reference is made to the above description relating to FIGS. 1 to 3, which are also applicable for the present embodiment according to FIG. 4.

FIG. 4E shows further details of the track shape of the outer first ball tracks 22A (upper half of the Figure) and of the outer second ball tracks 22B (lower half of the Figure) of the outer joint part 12.

The individual track portions 22Ao, 22Az, 22Aa, respectively the individual center line portions Ao, Az, Aa, of the outer first ball tracks 22A are characterised by their different curvatures and radii respectively. The reference radius RRA, whose radius center is in the joint center M and whose end is defined by the point of intersection of the center line A with the joint central plane EM, are presently not shown for reasons of clarity.

The first center line A, at the aperture side, comprises a center line portion Ao which extends radially outside the first reference radius RRA. For this purpose, the portion Ao comprises a circular arch whose radius RAo around the center MAo is greater than the first reference radius RRA. The center MAo of the portion Ao is positioned in the joint central plane EM and, relative to the longitudinal axis L12, is offset away from the outer ball track 22. Inside the central track portion Az which extends around a small articulation range of ±2° around the joint central plane EM, more particularly exactly in the joint central plane EM, the center line A touches the reference radius RRA. The tangent TA located in this point at the center line A extends parallel to the longitudinal axis L12 (see FIG. 4B). The first center line A of the outer joint part 12 extends in the attachment-side center line portion Aa which adjoins the joint central plane EM, respectively the central portion Az, radially inside the first reference radius RRA. For this purpose, the portion Aa comprises a circular arch whose radius RAa around the center MAa is smaller than the first reference radius RRA. The center MAo of the portion Ao is located in the joint central plane EM and, relative to the longitudinal axis L12, is radially offset towards the outer ball track 22. It is understood that the center line A in the aperture-side and attachment side portion can also be provided in forms other than radii, for instance by an elliptical line.

The individual track portions 22Bo, 22Bz, 22Ba, respectively the individual center lines Bo, Bz, Ba of the outer second ball tracks 22B are characterised by their different curvatures and radii respectively. The reference radius RRB whose radius center is defined in the joint center M and whose end are defined by the intersection of the center line B with the joint central plane EM, for reasons of clarity, has not been drawn in.

It can be seen that the outer second ball track 22B, with reference to the joint center, extends point-symmetrical relative to the outer first ball track 22A. The aperture-side center line portion Bo of the second center line B extends radially inside the second reference radius RRB and the attachment-side portion Ba extends radially outside the second reference radius RRB. For this purpose, the aperture-side portion Bo comprises a circular arch whose radius RBo is smaller than the second reference radius RRB, and the attachment-side portion Ba has a circular arch whose radius RBa is greater than the second reference radius RRB. In the central track portion Bz, i.e. exactly in the joint center EM, the center line B touches the reference radius RRB (see FIG. 4B). The tangent TB located in this point at the center line B extends parallel to the longitudinal axis L12. The second center line B, too, in the aperture-side and attachment-side portions, can comprise a form other than that of a circular arch.

Figure 4F:
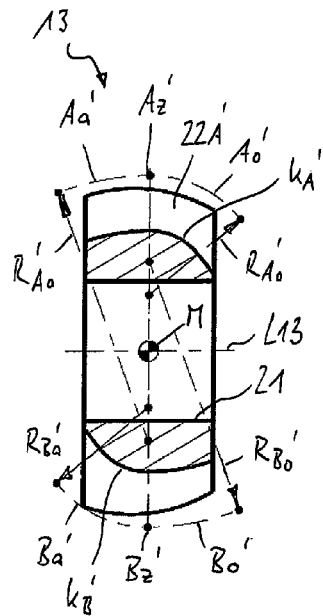
FIG. 4F shows the inner joint part of the joint of FIG. 4A along sectional line V-V.

FIG. 4F shows the inner joint part 13 of the constant velocity joint 11 in the form of a detail in a longitudinal section through the first ball track 23A (upper half of the Figure) and an opposed second ball track 23B (lower half of the Figure). A ball center line A' of the first ball tracks 23A of the inner joint part 13 is complementary to a ball center line A of the first ball tracks 22A of the outer joint part 12. This means that the first ball center line A' of the inner joint part 13 is mirror-symmetrical relative to the first ball center line A of the outer joint part 12 with reference to the joint central plane EM, respectively with reference to the angle-bisecting plane between the longitudinal axis L12 of the outer joint part 12 and of the longitudinal axis L13 of the inner joint part 13. The ball center line B' of the second ball tracks 23B of the inner joint part 13 is complementary to the ball center line B of the second ball tracks 22B of the inner joint part 12. This means, a second ball center line B' of the inner joint part 13 is mirror-symmetrical relative to a second ball center line B of the outer joint part 12 with reference to the joint central plane EM, respectively with reference to the angle-bisecting plane between the longitudinal axes L12 and L13.

To avoid any repetition regarding the tracks of the first and second ball center lines A', B' of the inner joint part 13, to that extent, reference is made to the description of the first and second ball tracks 22A, 22B of the outer joint part 12.

Overall, also for the present joint 11 it applies with regard to the first pairs of tracks 22A, 23A that a tangent TA at the outer contact line KA inside the outer central track portion Az extends parallel to a tangent TA' at the inner contact line KA' located inside the inner central track portion Az'. Accordingly, this also applies to the central track portions Bz, Bz' of the second pairs of tracks 22B, 23B, so that the axial forces in this central region are low. The opening angles δ, in at least one point inside the central track portions Az, Az; Bz, Bz', amount to zero. In addition, reference is made to the description for FIG. 1.

Figure 4G:
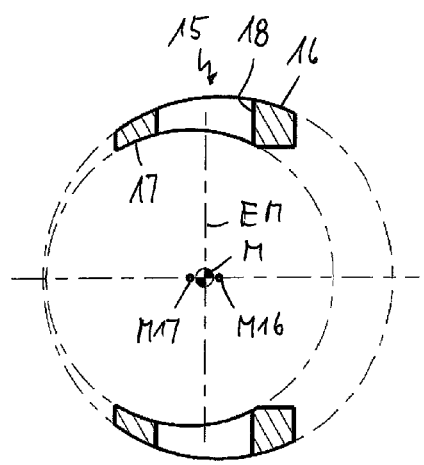
FIG. 4G shows the ball cage of the joint of FIG. 4A in a longitudinal section.
Figure 5A:
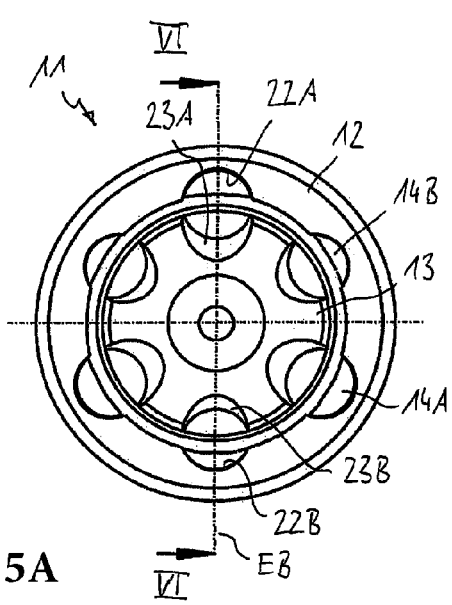
FIG. 5A shows an inventive constant velocity joint in a further embodiment in an axial view.
Figure 5B:
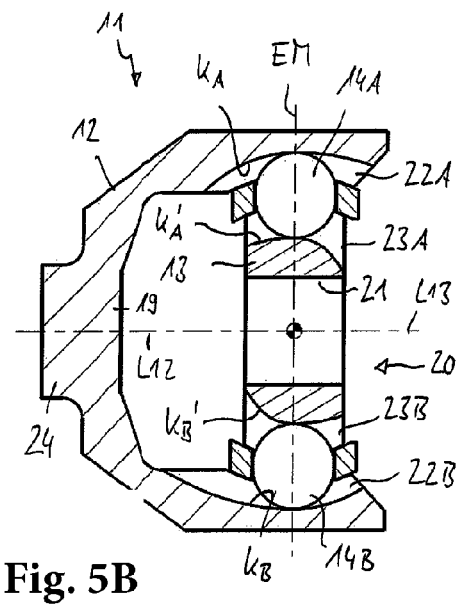
FIG. 5B shows the joint of FIG. 5A along sectional line VI-VI in an aligned condition.
Figure 5C:
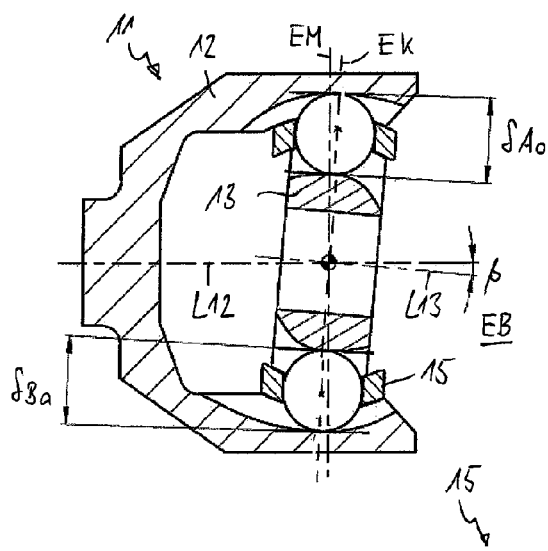
FIG. 5C shows the joint of FIG. 5A along sectional line VI-VI at a first articulation angle unequal zero.
Figure 5D:
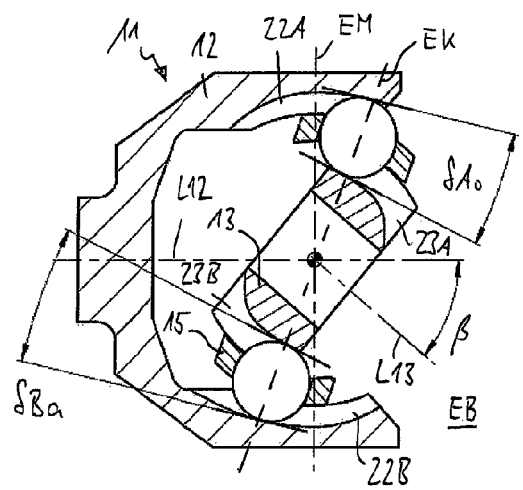
FIG. 5D shows the joint of FIG. 5A along sectional line VI-VI at a greater second articulation angle.
Figure 5E:
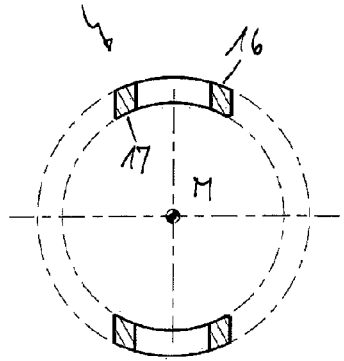
FIG. 5E shows the ball cage of the joint of FIG. 5A in a longitudinal section.
Figure 6A:
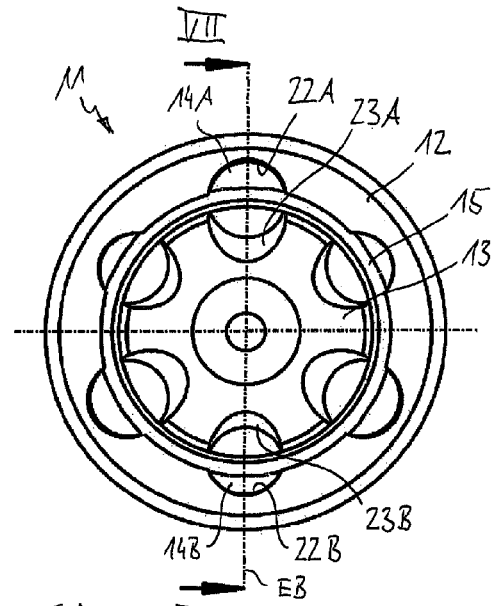
FIG. 6A shows an inventive constant velocity joint in a further embodiment in an axial view.
Figure 6B:
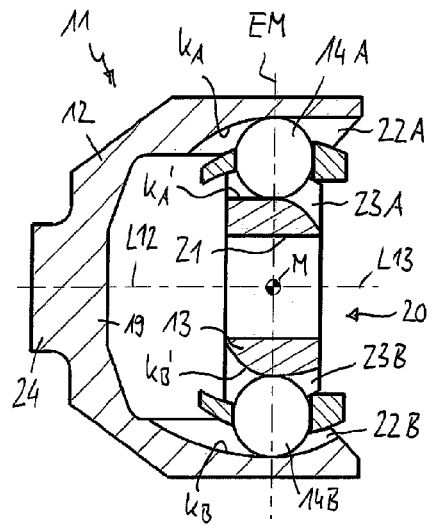
FIG. 6B shows a joint of FIG. 6A along sectional line VII-VII.
Figure 6C:
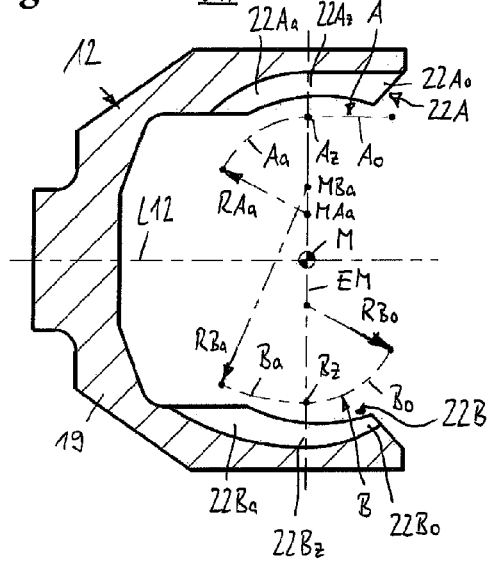
FIG. 6C shows the outer joint part of the joint according to FIG. 6B in the form of a detail.
Figure 6D:
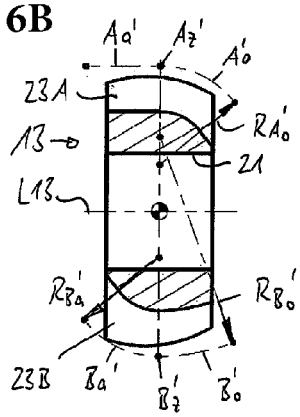
FIG. 6D shows the inner joint part of the joint according to FIG. 6B in the form of a detail.
Figure 6E:
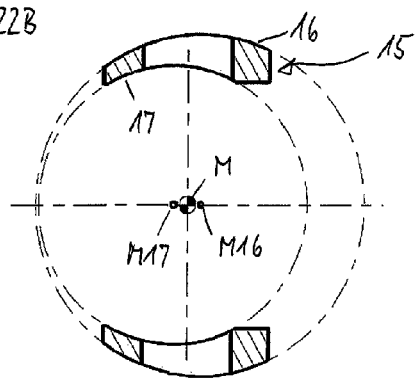
FIG. 6E shows the ball cage of the joint according to FIG. 6B in the form of a detail.
Figure 7A:
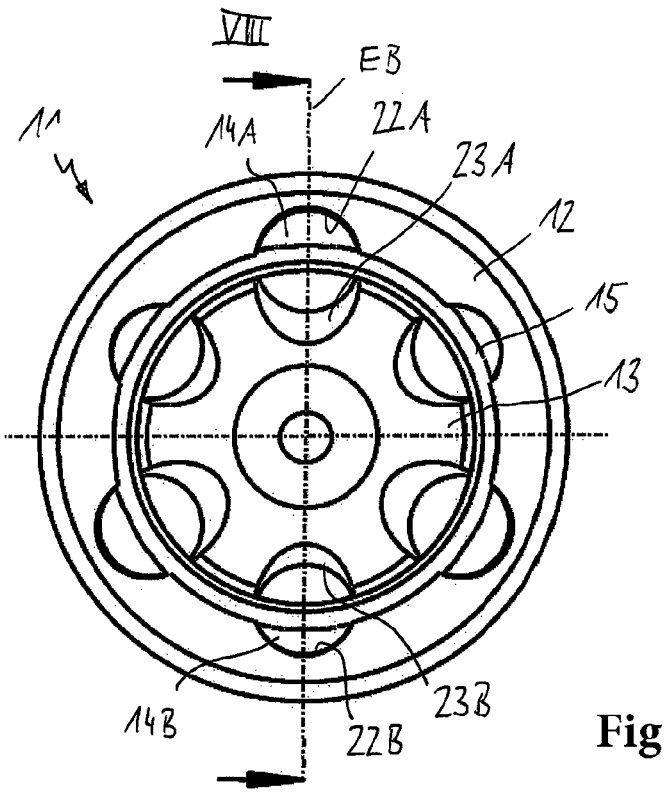
FIG. 7A shows an inventive constant velocity joint in a further embodiment in an axial view.
Figure 7B:
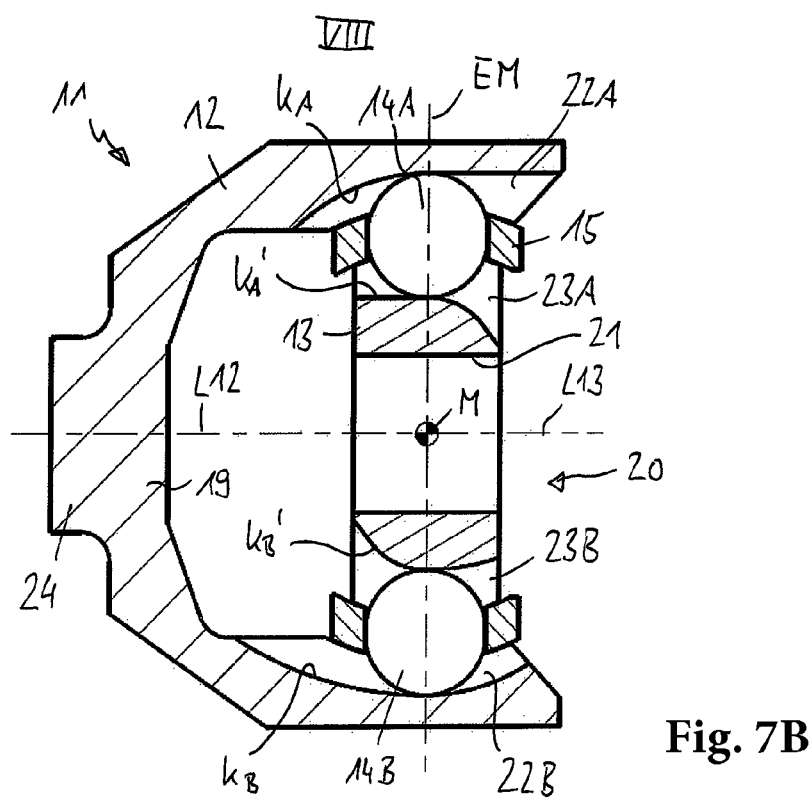
FIG. 7B shows the joint according to FIG. 7A along sectional line VIII-VIII, with the joint being in the aligned position.
Figure 7C:
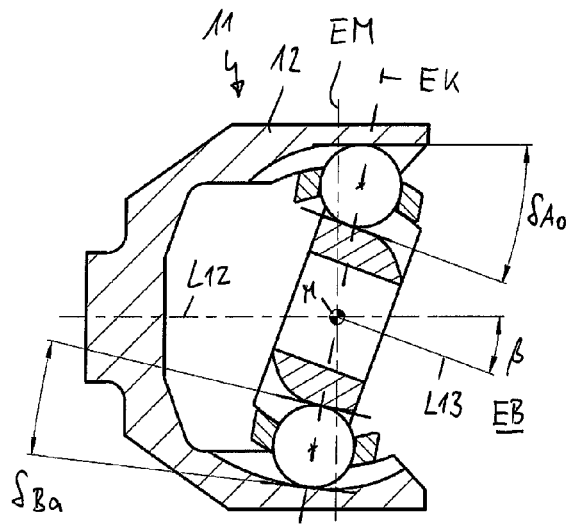
FIG. 7C shows the joint according to FIG. 7B at a positive first articulation angle of unequal zero.
Figure 7D:
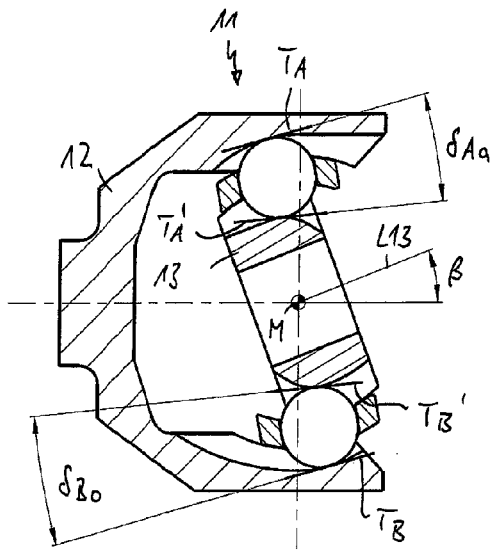
FIG. 7D shows the joint according to FIG. 7B at a negative second articulation angle unequal zero.
Figure 7E:
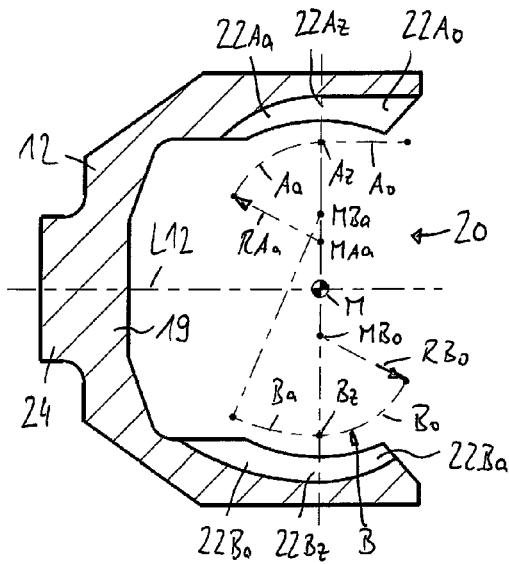
FIG. 7E shows the outer joint part of the joint according to FIG. 7B in the form of a detail.
Figure 7F:
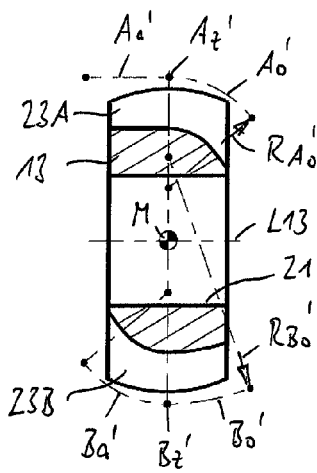
FIG. 7F shows the inner joint part of the joint according to FIG. 7B in the form of a detail.
Figure 7G:
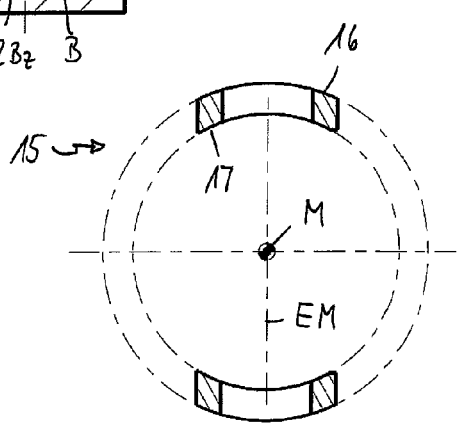
FIG. 7G shows the ball cage of the joint according to FIG. 7B in a longitudinal section.

FIG. 4G shows the ball cage 15 in the form of a detail. It can be seen that the first surface center M16 of the spherical face 16 and the second surface center M17 of the spherical face 17 each comprise an axial offset with reference to the joint central plane EM in directions pointing away from the joint central plane EM. As a result of the cage offset, the degree of ball wrap of the balls in the attachment-side track portions of the inner and outer ball tracks 22, 23 is increased.

FIGS. 5A to 5E will be described jointly below; they show a constant velocity joint 11 in a further embodiment which largely corresponds to the constant velocity joint according to FIG. 4A to 4G, so that as far as features are concerned which they have in common, reference is made to the above description, with identical components or components corresponding to one another having been given the same reference numbers.

The only difference consists in that the spherical inner face of the outer joint part 12 and the spherical outer face of the ball cage 15 extend concentrically relative to the joint center M. Accordingly it is proposed that the pair of faces between the ball cage 15 and the inner joint part 13 also extend concentrically relative to the joint center M. In other words, the constant velocity joint according to the present embodiment does not comprise a so-called cage offset. As a result, the attachment-side track portions of the outer and inner first and second ball tracks 22A, 23A; 22B, 23B are less deep and thus, in a cross-sectional view, comprise smaller wrap angles around the balls 14 received in the tracks. Furthermore, the tangent angles at the contact lines K, respectively at the center lines A, B of the ball tracks 22A, 23A; 22B, 23B are somewhat smaller. Otherwise, the joint according to FIGS. 4A to 4G corresponds to the above embodiment, so that reference is made to the above description.

FIGS. 6A to 6E will be described jointly below; they show a constant velocity joint in a further embodiment which largely corresponds to the constant velocity joint according to FIG. 4A to 4G, so that as far as features are concerned which they have in common, reference is made to the above description, with identical components or components corresponding to one another having been given the same reference numbers.

In the present embodiment according to FIG. 6, too, the aperture-side center line portion Ao of the first center line A extends radially outside the first reference radius RRA and the attachment-side portion Aa extends radially inside the first reference radius RRA. Accordingly, the aperture-side center line portion Bo of the second center line B extends radially inside and the attachment-side portion Ba radially outside the second reference radius RRB. In the central track portion Az, Bz, i.e. exactly in the central joint plane EM, the center lines A, B touch the respective reference radius RRA, RRB. The tangents T located in those points extend parallel to the respective longitudinal axes L12, L13, so that if the joint is operated inside the central portion of the joint 11, only low forces become effective between the first and the second pairs of tracks 22A, 23A; 22B, 23B and the respective balls 14A, 14B.

The only difference relative to the embodiment to FIG. 4 refers to the design of the aperture-side portion Ao of the first center line A of the outer joint part 12 and, accordingly to the attachment-side portion Aa' of the first center line A' of the inner joint part 13. According to the embodiment shown in FIGS. 6A to 6E, the aperture-side portion Ao is straight and undercut-free and, in the region of the central plane EM, it tangentially adjoins the central portion Az and extends towards the aperture end 20. The aperture-side portion Ao of the first center line A of the outer joint part 12 extends parallel to the longitudinal axis L12. Otherwise, the joint according to FIGS. 6A to 6E corresponds to the above embodiment and, to that extent, reference is made to the above description.

FIGS. 7A to 7G which will be described jointly below show a constant velocity joint 11 in a further embodiment which largely corresponds to the constant velocity joint according to FIGS. 6A to 6E so that, as far as the features are concerned which they have in common reference is made to the above description, with identical components or components corresponding to one another having the same reference numbers.

The only difference consists in that the spherical inner face of the outer joint part 12 and the spherical outer face of the ball cage 15 extend concentrically relative to the joint center M. Accordingly, it is proposed that the pair of spherical faces between the ball cage 15 and the inner joint part 13 extend concentrically relative to the joint center M. In other words, the constant velocity joint according to the present embodiment does not comprise a so-called cage offset. To that extent, the joint according to FIGS. 7A to 7G constitutes a combination of the joint according to FIGS. 6A to 6B (track shape) and of the joint according to FIGS. 5A to 5E (concentric cage), so that reference is made to the above description.

FIG. 8, with reference to an outer joint part 12, is a diagrammatic illustration of different designs of the center lines A of first ball tracks 22A and possible center lines B of second ball tracks 22B. This allows different possibilities of combining different embodiments of inventive constant velocity joints.

Boxes 8.1, 8.2 and 8.3 show the different designs of first center lines A1, A2 and A3 of the first ball tracks 22A. Box 8.1 shows an aperture-side portion Ao1 which is formed by a circular arch having a larger radius than the reference radius RRA. Such a design is present in the embodiments according to FIGS. 4 and 5. Box 8.2 shows the aperture-side portion Ao2 of a center line A2, which portion Ao2 is formed by a straight line. The aperture-side straight portion Ao2, in the joint central plane EM, tangentially adjoins the reference radius RRA. This design is present in the joints according to FIGS. 6 and 7. Box 8.3 shows the aperture-side portion Ao3 of a further center line A3. In this case, the aperture-side portion Ao3 is formed by a circular arch with a convex curvature whose center is located in the joint central plane EM radially outside the reference radius RRA. The attachment-side portions Aa of the center lines A1, A2, A3 are identical to one another and are formed by a circular arch whose radius RAa is smaller than the reference radius RRA.

Boxes 8.4, 8.5 and 8.6 show the different designs of second center lines B1, B2, B3 of the second ball tracks 22B. Boxes 8.4, 8.5, 8.6 show embodiments with second center lines B1, B2, B3 that each comprise a change in curvature in a second central track portion of the second center lines. Boxes 8.1, 8.2 and 8.3 show first center lines A1, A2, A3 that each comprise a change in curvature in a first central track portion of the first center lines. In the combination A3/B8 of boxes 8.3 and 8.6, the first center line A3 and the second center lines B3 each comprise a turning point in the respective first and second track portion. The center lines B1, B2, B3, with reference to the joint central plane EM, are mirror-symmetrical relative to the center lines A1, A2, A3 of the first ball tracks 22A, which means that the center line B1 is mirror-symmetrical relative to the center line A1, the center line B2 is mirror-symmetrical relative to the center line A2 and the center line B3 is mirror-symmetrical relative to the center line A3.

Each of the designs of the center lines A of the outer first ball track 22A—as shown in boxes 8.1, 8.2. 8.3—can be combined with each of the designs of the center lines B of the outer second ball track 22B—as shown in boxes 8.4, 8.5, 8.6. This results in the matrix, as shown, with nine different embodiments of joints, with the following possibilities of combining first and second center lines A, B: A1/B1, A2/B1, A3/B1, A1/B2, A2/B2, A3/B2, A1/B3, A2/B3, A3/B3.

It is understood that the track shapes of the outer first and second ball tracks 22A, 22B and accordingly also the track shapes of the inner first and second ball tracks 23A, 23B can also be formed in ways other than those shown. Thus, each of the track portions as illustrated can also have a shape which deviates from a circular arch or straight line, such as an elliptical, spiral and/or hyperbolic form and, respectively, a mathematical function of a higher order.

An advantage of all the above-described constant velocity joints 11 consists in that each of those, inside a small articulation angle range around the joint central plane EM, at least in one sectional plane, comprises a track shape wherein no resulting axial forces are effective between the ball tracks 22, 33 and the balls 14 along the ball tracks. As a result, the ball cage 15, at least in this range, is free from axial forces with reference to the contact faces with the outer joint part 12 and the inner joint part 13. Overall, when the joint 11 is in operation, the friction forces and thus also the friction losses are low within the central portion. At greater articulation angles, i.e. when the joint 11 is operated outside the small joint articulation range, the shape of the first and second ball tracks 22A, 23A; 22B, 23B achieves opening angles δ at the first and second balls 14A, 14B which open in opposite directions. There are thus achieved good cage control conditions at larger articulation angles.

The invention claimed is:

1. A constant velocity joint, comprising:
  an outer joint part with first outer ball tracks and second outer ball tracks having shapes that differ from one another,
  an inner joint part with first inner ball tracks and second inner ball tracks having shapes that differ from one another;
  wherein the first outer ball tracks and the first inner ball tracks form first pairs of tracks, wherein a first ball is disposed in each of said first pairs of tracks;
  wherein the second outer ball tracks and the second inner ball tracks form second pairs of tracks, wherein a second ball is disposed in each of said second pairs of tracks;
  wherein the outer joint part and the inner joint part are angularly movable relative to one another, wherein between a longitudinal axis of the outer joint part and a longitudinal axis of the inner joint part an articulation angle is defined, and wherein the longitudinal axis of the outer joint part and the longitudinal axis of the inner joint part form a joint articulation plane when the inner joint part is articulated relative to the outer joint part by an articulation angle which deviates from zero degrees;
  a ball cage which comprises circumferentially distributed cage windows in which the first balls and second balls are received;
  wherein the first balls and the second balls are held by the ball cage on a joint central plane when the longitudinal axis of the outer joint part and the longitudinal axis of the inner joint part are aligned coaxially, wherein a small articulation angle range is defined around the joint central plane which comprises at least the joint central plane and articulation angles which amount to a maximum of two degrees, wherein a large articulation angle range is defined which comprises articulation angles which are larger than a maximum articulation angle of the small articulation angle range;

wherein in each angular position of the constant velocity joint, if viewed at a first pair of tracks in the joint articulation plane, a first opening angle is formed between a first outer tangent to the first outer ball track and a first inner tangent to the first inner ball track, wherein said first outer tangent extends through a first outer contact point between the first ball and the first outer ball track, and wherein the first inner tangent extends through a first inner contact point between the first ball and the first inner ball track, wherein the first opening angle has a variable size as a function of the articulation angle;

wherein in each angular position of the constant velocity joint, if viewed at a second pair of tracks in the joint articulation plane, a second opening angle is formed between a second outer tangent to the second outer ball track and a second inner tangent to the second inner ball track, wherein said second outer tangent extends through a second outer contact point between the second ball and the second outer ball track, and wherein the second inner tangent extends through a second inner contact point between the second ball and the second inner ball track, wherein the second opening angle has a variable size as a function of the articulation angle, wherein, for at least one of the first pairs of tracks:
for at least one articulation angle within the small articulation angle range, a first outer tangent extends parallel to a first inner tangent, and
for at least one articulation angle within the large articulation angle range, an aperture-side first opening angle of a first ball moving in the joint articulation plane in a first outer ball track towards the aperture side of the outer joint part and an attachment-side first opening angle of a first ball moving at the same articulation angle in the joint articulation plane in a first outer ball track towards the attachment side of the outer joint part are unequal to zero;

wherein for at least one of the second pairs of tracks:
for at least one articulation angle within the small articulation angle range, a second outer tangent extends parallel to a second inner tangent, and
for at least one articulation angle within the large articulation angle range, an aperture-side second opening angle of a second ball moving in the joint articulation plane in a second outer ball track towards the aperture side of the outer joint part and an attachment-side second opening angle of a second ball moving at the same articulation angle in the joint articulation plane in a second outer ball track towards the attachment side of the outer joint part are unequal to zero, wherein the aperture-side first opening angle of the at least one first pair of tracks and the aperture-side second opening angle of the at least one second pair of tracks widen in opposite axial directions, and wherein the attachment-side first opening angle of the at least one first pair of tracks and the attachment-side second opening angle of the at least one second pair of tracks widen in opposite axial directions.

2. A constant velocity joint according to claim 1,
wherein the at least one first pair of tracks is designed such that for articulation angles within the small articulation angle range, for which the first opening angle is greater than zero, an aperture-side first opening angle of a first ball moving in the joint articulation plane towards the aperture side of the outer joint part and an attachment-side first opening angle of a first ball moving at the same articulation angle in the joint articulation plane towards the attachment side of the outer joint part open in opposite axial directions, and
that the at least one second pair of tracks is designed such that for articulation angles within the small articulation angle range, for which the second opening angle is greater than zero, an aperture-side second opening angle of a second ball moving in the joint articulation plane towards the aperture end of the outer joint part and an attachment-side second opening angle of a second ball moving at the same articulation angle in the joint articulation plane towards the attachment end of the outer joint part open in opposite axial directions.

3. A constant velocity joint according to claim 1,
wherein at least one of the first pair of tracks is designed such that for articulation angles within the small articulation angle range, for which the first opening angle is greater than zero, an aperture-side first opening angle of a first ball moving in the joint articulation plane towards the aperture end of the outer joint part and an attachment-side opening angle of a first ball moving at the same articulation angle in the joint articulation angle towards the attachment end of the outer joint part open in a same axial direction, and
that the at least one second pair of tracks is designed such that for articulation angles within the small articulation angle range, for which the opening angle is greater than zero, the aperture-side second opening angle of a second ball moving in the joint articulation plane towards the aperture end of the outer joint part and an attachment-side second opening angle of a second ball moving at the same articulation angle in the joint articulation plane towards the attachment end of the outer joint part open in a same axial direction.

4. A constant velocity joint according to claim 1,
wherein at articulation angles being within the large joint articulation angle range at least one of the aperture-side first opening angle and the attachment-side first opening angle of the at least one first pair of tracks, and at least one of the aperture-side second opening angle and the attachment-side second opening angle of the at least one second pair of tracks amounts of a value greater than zero and smaller than eight degrees.

5. A constant velocity joint according to claim 1,
wherein the large articulation angle range directly adjoins the small articulation angle range.

6. A constant velocity joint according to claim 1,
wherein the large articulation angle range comprises articulation angles which are positioned outside the small joint articulation angle range and which amount to at least up to 20 degrees.

7. A constant velocity joint according to claim 1,
wherein the ball cage comprises a spherical outer face for guiding the ball cage relative to an inner face of the outer joint part and a spherical inner face for guiding the ball cage relative to an outer face of the inner joint part, wherein an axial offset is provided between a center of the spherical outer face and a center of the spherical inner face.

8. A constant velocity joint according to claim 1,
wherein, when moving along the outer and inner first ball tracks, the centers of the first balls define a respective first center line, wherein the first center lines, along their respective length, each comprise at least two first track portions with different curvatures, and that, when moving along the outer and inner second ball tracks, the centers of the second balls each define a second center line, wherein the second center lines, along their respective length, each comprise at least two track portions with different curvatures.

9. A constant velocity joint according to claim 8, wherein the first center lines each comprise a change in curvature in a first central track portion, and that the second center lines each comprise a change in curvature in a second central track portion of the second center lines.

10. A constant velocity joint according to claim 9, wherein the first center lines and the second center lines each comprise a turning point in the respective first and second central track portion.

11. A constant velocity joint according to claim 8, wherein the first outer ball track is designed such that the first center line in a first attachment-side track portion and in a first aperture-side track portion of the outer joint part extends radially outside a first circular arch portion defined by a first reference radius, wherein the first reference radius extends from the joint center to a central plane intersection of the first center line and the joint central plane, and that the second outer ball track is designed such that the second center line in a second attachment-side track portion and in a second aperture-side track portion of the outer joint part extends radially inside a circular arch portion defined by a second reference radius, wherein the second reference radius extends from the joint center to a central plane intersection of the second center line and the joint central plane.

12. A constant velocity joint according to claim 11, wherein the first outer ball track is designed such that the first center line in the first attachment side track portion and aperture-side track portion of the outer joint part each comprise at least one of:

a concave circular arch portion with a radius around a circular arch portion center which is positioned in the joint central plane and which, relative to the longitudinal axis of the outer joint part, comprises a radial offset away from the first outer ball track, a straight portion, and a convex circular arch portion with a radius around a circular arch center which is positioned in the joint central plane radially outside the first reference radius.

13. A constant velocity joint according to claim 11, wherein the second outer ball track is designed such that the second center line in the second attachment-side track portion and aperture-side track portion of the outer joint part comprises a circular arch portion with the radius around the circular arch center which is positioned in the joint central plane and which, relative to the longitudinal axis of the outer joint part, comprises a radial offset towards the second outer ball track.

14. A constant velocity joint according to claim 8, wherein the first outer ball track is designed such that the first center line in a first attachment-side track portion extends radially inside a circular arch portion defined by a first reference radius, wherein the first reference radius extends from the joint center to a central plane intersection of the first center line and the joint central plane and, in a first aperture-side track portion, extends radially outside the first circular arch portion, and that the second outer ball track is designed such that the second center line in a second attachment-side track portion extends radially outside a circular arch portion defined by a second reference radius, wherein the second reference radius extends from the joint center to a central plane intersection of the second center line and the joint central plane, and in a second aperture-side track portion extends radially inside the first circular arch portion.

15. A constant velocity joint according to claim 14, wherein the first outer ball track is designed such that the first center line in the first aperture-side track portion of the outer joint part comprises at least one of:

a concave circular arch portion with a radius around a circular arch center which is positioned in the joint central plane and which, relative to the longitudinal axis of the outer joint part, comprises a radial offset away from the first outer ball track, a straight portion, a convex circular arch portion with a radius around a circular arch center which is positioned in the joint central plane radially outside the first reference radius, and that the second outer ball track is designed such that the second center line in the second attachment-side track portion of the outer joint part comprises at least one of:

a concave circular arch portion with a radius around a circular arch center which is positioned in the joint central plane and which, relative to the longitudinal axis of the outer joint part comprises a radial offset away from the second outer ball track, a straight portion, a convex circular arch portion with a radius around a circular arch center which is positioned in the joint central plane radially outside the second reference radius.

16. A constant velocity joint according to claim 15, wherein the first outer ball track is designed such that the first center line in the first attachment-side track portion of the outer joint part comprises a circular arch portion with the radius around a circular arch center which is positioned in the joint central plane and which, relative to the longitudinal axis of the outer joint part, comprises a radial offset towards the first outer ball track, and that the second outer ball track is designed such that the second center line in the second aperture-side track portion of the outer joint part comprises a circular arch portion with the radius around a circular arch center which is positioned in the joint central plane and which, relative to the longitudinal axis of the outer joint part, comprises a radial offset towards the second outer ball track.

17. A constant velocity joint according to claim 1, wherein all the first ball tracks are identical relative to one another and that all the second ball tracks are identical relative to one another.

* * * * *